(12) United States Patent
Shimaoka et al.

(10) Patent No.: US 6,776,510 B1
(45) Date of Patent: Aug. 17, 2004

(54) LIGHT SOURCE DEVICE, ADJUSTING DEVICE THEREFORE AND PRODUCTION METHOD THEREFORE, AND ILLUMINATING DEVICE AND PROJECTION TYPE DISPLAY DEVICE PROVIDED WITH LIGHT SOURCE DEVICE

(75) Inventors: Yuusaku Shimaoka, Osaka (JP); Shinya Sannohe, Osaka (JP); Takamasa Yoshikawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/701,330

(22) PCT Filed: Mar. 30, 2000

(86) PCT No.: PCT/JP00/02052

§ 371 (c)(1),
(2), (4) Date: Nov. 27, 2000

(87) PCT Pub. No.: WO00/58786

PCT Pub. Date: Oct. 5, 2000

(30) Foreign Application Priority Data

Mar. 31, 1999 (JP) ............................................. 11-091525

(51) Int. Cl.[7] .............................. F21V 17/02; H01J 9/42
(52) U.S. Cl. ........................ 362/298; 362/277; 362/319; 445/4; 445/64
(58) Field of Search ........................... 445/3, 4, 63, 64; 353/87; 356/121–123; 362/270, 298, 306, 277, 319

(56) References Cited

U.S. PATENT DOCUMENTS

| | | | | |
|---|---|---|---|---|
| 1,408,875 A | * | 3/1922 | Foley | 362/277 |
| 1,876,511 A | * | 9/1932 | Oberg et al. | 362/277 |
| 1,909,946 A | * | 5/1933 | Graham | 356/122 |

(List continued on next page.)

FOREIGN PATENT DOCUMENTS

| | | |
|---|---|---|
| JP | 62-42182 | 2/1987 |
| JP | 4-131834 | 5/1992 |
| JP | 4-331942 | 11/1992 |
| JP | 5-313117 | 11/1993 |
| JP | 7-128739 | 5/1995 |
| JP | 7-288018 | 10/1995 |
| JP | 8-262437 | 10/1996 |
| JP | 9-138378 | 5/1997 |
| JP | 10-97973 | 4/1998 |
| JP | 11-52489 | 2/1999 |

OTHER PUBLICATIONS

International Search Report.

*Primary Examiner*—Alan Cariaso
(74) *Attorney, Agent, or Firm*—Merchant & Gould P.C.

(57) ABSTRACT

A light source apparatus in which an optical arrangement of a light source and a concave mirror is properly adjusted without requiring a large-scale device and a method for manufacturing the same, an adjusting device for adjusting the optical arrangement in the light source apparatus, and a lighting system and a projection display system using the light source apparatus. A lamp housing in which the optical arrangement is adjusted is realized by mounting a tungsten lamp anchoring plate (122), to which a tungsten lamp (121) is fixed, to an ellipsoidal mirror anchoring plate (103) before mounting an arc lamp; moving and fixing a base substrate (104) on a bottom plate (106) so that the diameter of a light spot of light reflected by an ellipsoidal mirror (102) and condensed on an ellipsoidal mirror condensed-state confirming surface (105) at a minimum, the ellipsoidal mirror condensed-state confirming surface (105) being placed at the position where the second focal point of the ellipsoidal mirror (102) should be placed; and removing the tungsten lamp (121) and mounting the arc lamp. Furthermore, a lighting system and a projection display system are constructed using this lamp housing.

52 Claims, 20 Drawing Sheets

U.S. PATENT DOCUMENTS

| | | | |
|---|---|---|---|
| 2,258,355 A | * 10/1941 | Douglass | 356/123 |
| 2,293,014 A | * 8/1942 | Clarkson | 362/277 |
| 3,026,408 A | * 3/1962 | Anderson et al. | 362/277 |
| 3,703,635 A | 11/1972 | Burkarth | 362/300 |
| 3,827,782 A | 8/1974 | Boudouris et al. | 359/846 |
| 4,110,036 A | * 8/1978 | Guillaume | 353/87 |
| 4,156,889 A | 5/1979 | Halberstadt et al. | 362/16 |
| 4,388,679 A | * 6/1983 | Blaisdell et al. | 362/306 |
| 4,519,020 A | * 5/1985 | Little | 362/277 |
| 4,914,556 A | * 4/1990 | Richardson | 362/277 |
| 5,054,909 A | 10/1991 | Larsen | 352/198 |
| 5,257,051 A | 10/1993 | Bushroe | 353/122 |
| 5,295,056 A | * 3/1994 | Peck | 362/277 |

* cited by examiner

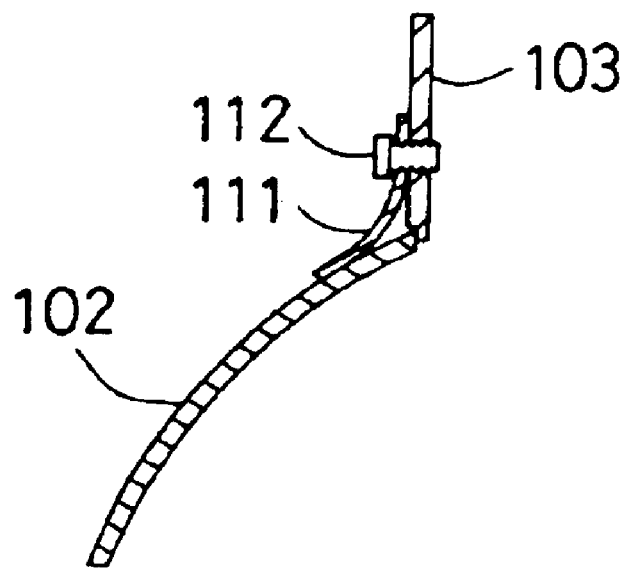
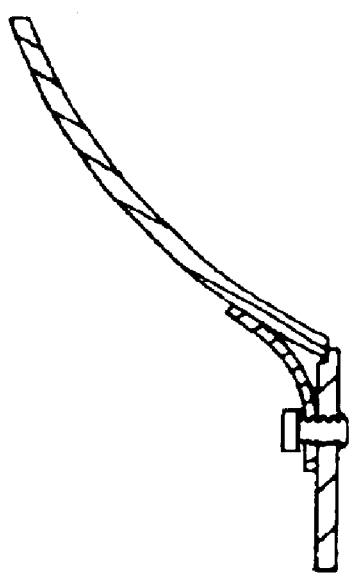
FIG. 8

LIGHT SOURCE DEVICE, ADJUSTING DEVICE THEREFORE AND PRODUCTION METHOD THEREFORE, AND ILLUMINATING DEVICE AND PROJECTION TYPE DISPLAY DEVICE PROVIDED WITH LIGHT SOURCE DEVICE

TECHNICAL FIELD

The present invention relates to a light source apparatus including a light source and a concave mirror and a method for manufacturing the same, an adjusting device for adjusting the optical arrangement of the light source and the concave mirror so that light from the light source can be utilized in the light source apparatus with maximum efficiency, and a lighting system and a projection display system using the light source apparatus.

BACKGROUND ART

In recent years, projection display systems using various types of optical modulators have drawn attention as an imaging apparatus for projecting on a large screen. When displaying on a large screen with these projection display systems, a most significant characteristic is brightness. The brightness is determined depending on the luminance of a lamp, the condensing efficiency of a reflector, the lighting efficiency of a lighting lens system, the efficiency of utilizing the light of an optical modulator, and the like. Among these, to utilize the luminance of the lamp and the condensing efficiency of the reflector at a maximum, it is necessary to adjust the optical arrangement of the lamp and the reflector properly. If the optical arrangement is not adjusted, sufficient light output cannot be obtained.

In a projection display system, because the life of the lamp is shorter than the life of the entire system, most projection display systems are provided with a mechanism capable of exchanging a lamp housing assembly, for example, when the lamp is exhausted. This lamp housing assembly is a light source apparatus which is configured to be removable from the projection display system, and comprises a reflector and a lamp fixed after being adjusted for its position with respect to the reflector.

Traditionally, in an exchangeable lamp housing, for size reduction or cost reduction, the position of the lamp with respect to the reflector is determined by fixing a reflector anchoring plate for anchoring the reflector, to the bottom plate of the lamp housing, and adjusting only the position of the lamp. That is, the position of the reflector with respect to the bottom plate of the lamp housing is fixed. Furthermore, the position of the lamp is adjusted under the condition in which the lamp housing is incorporated in a projection display system, or under the condition in which the lamp housing is incorporated in an optical system of a partly simplified projection display system.

As the reflector, metal reflectors produced by electrolytic deposition, glass reflectors, and the like may be used. Although these reflectors are different in their respective materials, they are common in having machined end faces. In general, the dimensional tolerance of the external shape of the reflector is about from 0.1 mm to 0.5 mm.

As a first prior art example for adjusting a light source apparatus, FIG. 18 shows a basic configuration of an adjusting means disclosed in the publication of JP-5-313117A. In this configuration, only the position of the lamp is adjusted.

In the conventional configuration shown in FIG. 18, the traveling direction of light reflected by a reflector 202 is determined as the direction of Z-axis, and the directions crossing at right angles in a plane crossing perpendicularly to the Z-axis are determined as the directions of X-axis and Y-axis, respectively. First, a lamp 201 is moved and positioned in the direction of Z-axis so that illumination of light irradiated on a screen 215 by reflected light is at a maximum, and so that the ratio of the amount of light at the center to the periphery on the screen 215 is at a minimum.

Then, the lamp 201 is moved in the direction of X-axis or Y-axis, and positioning is carried out by adjusting the position of the lamp 201 in the direction of X-axis or Y-axis so that the position of the greatest illumination of light irradiated on the screen 215 by reflected light becomes the center of the screen.

Next, as a second prior art example for adjusting a light source apparatus, a configuration disclosed in the publication of JP-9-138378A is shown. In this configuration, only the position of the reflector is adjusted. In this second prior art example, first, as shown in FIG. 19, a semiconductor laser 316 and a photodiode 317 are placed on an optical axis 110 at positions where the first and second focal points of an ellipsoidal reflector 315 should be located, respectively.

Then, the ellipsoidal reflector 315 is placed at an approximate position, and light emitted from the semiconductor laser 316 is reflected by the ellipsoidal reflector 315 and received by the photodiode 317.

The procedure for adjustment is as follows: first, the ellipsoidal reflector 315 is moved in the direction of the optical axis 110, and adjusted for its position so that the light spot at the photodiode 317 at a minimum. At this time, the light spot is not necessarily located on the optical axis 110.

Then, the ellipsoidal reflector 315 is moved in the directions crossing perpendicularly to the optical axis 110, and adjusted for its position so that the light spot at the photodiode 317 is at a minimum. At this time, the light spot also is not necessarily located on the optical axis 110. Then, adjustment is carried out by changing the tilt of the ellipsoidal reflector 315 so that the position of the light spot at the photodiode 317 is on the optical axis 110. In the second prior art example, the position of the ellipsoidal reflector 315 is adjusted by the above procedure.

As a third prior art example for adjusting a light source apparatus, a configuration disclosed in the publication of JP-10-97973A is shown. In this configuration, parts other than the lamp and the reflector are adjusted. In this third prior art example, as shown in FIG. 20, a discharge lamp 401 is arranged so that the portion of the largest luminance in its luminous part is located at the first focal point of an ellipsoidal condensing mirror 402.

The second focal point of the ellipsoidal condensing mirror 402 is located in the outgoing part of the lamp housing, and light of the lamp is condensed on the second focal point. The outgoing part of the lamp housing is provided with an illumination adjusting mechanism 411, which moves the position of the incoming end of light-transmitting fiber 412 in the direction of the optical axis 110. Illumination is adjusted by adjusting the distance between the incoming end of the light-transmitting fiber 412 and the second focal point, with this illumination adjusting mechanism 411.

In the first prior art example, because adjustment is carried out only for the lamp, but not for the reflector, there is a problem that when the dimensional tolerance of the reflector is large, light output is reduced. Table 1 shows an example of the relationship between the tolerance of the reflector (ellipsoidal mirror, spherical mirror) in the direction of the optical axis, and light output. As is known from this table, when there is a tolerance of 0.5 mm, light output is decreased by 14%.

TABLE 1

| Tolerance in the direction of the optical axis (tolerance in the direction of condensing light from design position is determined positive) | Change in light output when an ellipsoidal mirror has a tolerance | Change in light output when a spherical mirror has a tolerance |
| --- | --- | --- |
| −0.5 mm | 86% | 95% |
| −0.4 mm | 90% | 98% |
| −0.3 mm | 94% | 100% |
| −0.2 mm | 97% | 100% |
| −0.1 mm | 98% | 100% |
| 0 mm | 100% | 100% |
| +0.1 mm | 96% | 97% |
| +0.2 mm | 94% | 96% |
| +0.3 mm | 93% | 96% |
| +0.4 mm | 91% | 91% |
| +0.5 mm | 86% | 87% |

Furthermore, in the first prior art example, because it is necessary to adjust the light source apparatus by detecting irradiated light projected on the screen 215, adjustment can be carried out only under the condition in which the lamp 201 is lighted after assembling a display system including a lens 212, an optical modulator 213, and a projection lens 214. Consequently, the work efficiency of the adjustment is poor, and also there is a problem that the device for the adjustment is of large scale.

Also, in the above-mentioned second prior art example, there is a problem that an adjusting device capable of adjusting the ellipsoidal reflector 315 in three directions, namely, the direction parallel to the optical axis 110, the direction perpendicular to the optical axis 110, and the gate direction with respect to the optical axis 110, is required, and the adjusting device is of large scale. Moreover, although it is not described in this prior art publication, it also has a problem that when the adjusting device itself is within the image display system, cost is required for attaching the adjusting device to each reflector.

Furthermore, such a configuration as in the third prior art example has problems that it is limited to a lighting system using light-transmitting fiber, and that the light-transmitting fiber 412 is damaged when light output of the lamp becomes large.

The present invention has been accomplished to solve these problems. It is an object of the present invention to provide a light source apparatus under the condition in which the optical arrangement is adjusted properly by a simple procedure without requiring a large-scale adjusting device. Also, it is another object of the present invention to provide bright lighting system and projection display system having high efficiency for utilizing light, using this light source apparatus.

DISCLOSURE OF THE INVENTION

In order to accomplish the above object, the present invention provides a first light source apparatus including a light source and a concave mirror for condensing light emitted from the light source, the light source apparatus including a movable substrate that is set on a bottom plate of the light source apparatus and is movable in a traveling direction of light condensed by the concave mirror, and a concave mirror anchoring plate for anchoring the concave mirror to the movable substrate.

Accordingly, within the first light source apparatus, only by moving the movable substrate with respect to the bottom plate, the optical arrangement in the traveling direction of light condensed by the concave mirror can be adjusted easily without changing the relative positions of the concave mirror and the concave mirror anchoring plate. Furthermore, the optical arrangement in the gate direction can be adjusted easily by adjusting the fixed position of the concave mirror with respect to the concave mirror anchoring plate. As a result, it is possible to provide a light source apparatus having a properly adjusted optical arrangement without requiring a large-scale adjusting device.

It is preferable that the first light source apparatus further includes a concave mirror fixing member for fixing the concave mirror to the concave mirror anchoring plate, and the concave mirror fixing member is a plate spring made of stainless steel. Accordingly, the concave mirror can be fixed firmly and easily to the concave mirror anchoring plate.

It is preferable that the thickness of the plate spring is greater than 0.2 mm, but is smaller than 0.5 mm. By setting the thickness of the plate spring within this range, damages caused when fixing the concave mirror to the concave mirror anchoring plate, and damages due to generation of heat rays during lighting of the light source and the resulting thermal expansion of the concave mirror can be prevented.

It is preferable that the first light source apparatus includes on the bottom plate, a positioning member for fixing a condensed-state confirming means used when adjusting the position of the concave mirror with respect to the bottom plate. Accordingly, the optical arrangement can be adjusted more easily.

It is preferable that the first light source apparatus includes a movable substrate fixing member for fixing the movable substrate to the bottom plate. Accordingly, a properly adjusted optical arrangement can be maintained during transportation or use of the light source apparatus after completing the adjustment of the optical arrangement.

In the first light source apparatus, it is preferable that an arc lamp is used as the light source, and the center of the luminous part of the arc lamp coincides with the first focal point of the concave mirror. This provides the advantage that light emitted from the arc lamp as the light source can be utilized effectively.

In the first light source apparatus, it is preferable that the concave mirror is an ellipsoidal mirror.

In order to accomplish the above object, the present invention provides a second light source apparatus including a light source, a first concave mirror for condensing light emitted from the light source, and a second concave mirror having a reflection surface opposing a reflection surface of the first concave mirror, the second light source apparatus including: a movable substrate that is set on a bottom plate of the light source apparatus and is movable in a traveling direction of light condensed by the first concave mirror; a first concave mirror anchoring plate for anchoring the first concave mirror to the movable substrate; and a second concave mirror anchoring plate that is attached to the first concave mirror anchoring plate and anchors the second concave mirror.

Accordingly, within the second light source apparatus, only by moving the movable substrate with respect to the bottom plate, the optical arrangement in the traveling direction of light condensed by the first concave mirror can be adjusted easily without changing the relative positions of the first concave mirror, the first concave mirror anchoring plate, the second concave mirror, and the second concave mirror anchoring plate. As a result, it is possible to provide a light source apparatus having a properly adjusted optical arrangement without requiring a large-scale adjusting device.

It is preferable that the second light source apparatus further includes a first concave mirror fixing member and a second concave mirror fixing member for fixing the first and second concave mirrors to the first and second concave mirror anchoring plates, respectively, and the first and second concave mirror fixing members are plate springs made of stainless steel. Accordingly, the first and second concave mirrors are fixed firmly and easily to the first and second concave mirror anchoring plates, respectively.

It is preferable that the thickness of the plate springs is greater than 0.2 mm, but is smaller than 0.5 mm. By setting the thickness of the plate springs within this range, damages caused when fixing the concave mirror to the concave mirror anchoring plate, and damages due to generation of heat rays during lighting of the light source and resulting thermal expansion of the concave mirror can be prevented.

It is preferable that the second light source apparatus includes, on the bottom plate, a positioning member for fixing a condensed-state confirming means used when adjusting a position of the first concave mirror with respect to the bottom plate. Accordingly, the optical arrangement can be adjusted more easily.

It is preferable that the second light source apparatus includes a movable substrate fixing member for fixing the movable substrate to the bottom plate. Accordingly, a properly adjusted optical arrangement can be maintained during transportation or use of the light source apparatus after completing adjustment of the optical arrangement.

It is preferable that the second light source apparatus includes an anchoring plate position adjusting means that adjusts the relative positions of the first and second concave mirror anchoring plates. Accordingly, the position of the second concave mirror with respect to the first concave mirror can be adjusted without changing the relative positions of the first concave mirror, the first concave mirror anchoring plate, and the movable substrate.

In the second light source apparatus, it is preferable that the anchoring plate position adjusting means is placed at four corners of the first and second concave mirror anchoring plates. This provides the advantage that, when changing the relative positions of the first and second concave mirrors to adjust their optical arrangement, dislocation in the gate direction is less likely to occur compared to the case in which the anchoring plate position adjusting means is placed at one to three positions. On the other hand, if the anchoring plate position adjusting means is placed at five or more positions, demerits such as the increase in the cost of providing the anchoring plate position adjusting means and the increase in the labor of adjusting the position exceed the degree of increase in the effect of preventing dislocation in the gate direction. Thus, placing the anchoring plate position adjusting means at four positions make it possible to realize the configuration for changing the relative positions of the first and second concave mirrors most effectively.

It is preferable that the second light source apparatus includes an anchoring plate fixing means for fixing relative positions of the first and second concave mirror anchoring plates. Accordingly, the first and second concave mirrors can be fixed under the condition in which relative optical arrangement is adjusted properly.

In the second light source apparatus, it is preferable that the anchoring plate fixing means is placed at four corners of the first and second concave mirror anchoring plates. Accordingly, the relative positions of the first and second concave mirrors can be fixed reliably and effectively.

In the second light source apparatus, it is preferable that an arc lamp is used as the light source, and the center of the luminous part of the arc lamp coincides with the first focal point of the first concave mirror. This provides the advantage that light emitted from the arc lamp as the light source can be utilized effectively.

In the second light source apparatus, it is preferable that the first concave mirror is an ellipsoidal mirror.

In the second light source apparatus, it is preferable that the second concave mirror is a spherical mirror.

In order to accomplish the above object, the present invention also provides a first lighting system including any one of the above-mentioned first light source apparatuses, and an optical means for converting light condensed by the concave mirror of the first light source apparatus into approximately parallel light. According to this configuration, because the optical arrangement of the light source and the concave mirror is properly adjusted in the first light source apparatus, a bright lighting system with high efficiency of utilizing light can be provided.

In order to accomplish the above object, the present invention also provides a second lighting system including any one of the above-mentioned second light source apparatuses, and an optical means for converting light condensed by the first concave mirror of the second light source apparatus into approximately parallel light. According to this configuration, because the optical arrangement of the light source, the first concave mirror, and the second concave mirror is adjusted properly in the second light source apparatus, a bright lighting system with high efficiency of utilizing light can be provided.

In order to accomplish the above object, the present invention provides a first projection display system including any one of the above-mentioned first light source apparatuses, an optical means for converting light condensed by the concave mirror of the first light source apparatus into approximately parallel light, an optical modulator for forming an optical image by modulating light emitted from the optical means, and a projection lens for projecting the optical image. According to this configuration, because the optical arrangement of the light source and the concave mirror is adjusted properly in the first light source apparatus, a bright projection display system with high efficiency of utilizing light can be provided.

In order to accomplish the above object, the present invention also provides a second projection display system including any one of the above-mentioned second light source apparatuses, an optical means for converting light condensed by the first concave mirror of the second light source apparatus into approximately parallel light, an optical modulator for forming an optical image by modulating light emitted from the optical means, and a projection lens for projecting the optical image. According to this configuration, because the optical arrangement of the light source, the first concave mirror, and the second concave mirror is adjusted properly in the second light source apparatus, a bright projection display system with high efficiency of utilizing light can be provided.

In order to accomplish the above object, the present invention provides a first adjusting device for adjusting an optical arrangement, for a light source apparatus including a light source, a concave mirror for condensing light emitted from the light source, a movable substrate that is set on a bottom plate of the light source apparatus and is movable in a traveling direction of light condensed by the concave mirror, and a concave mirror anchoring plate for anchoring the concave mirror to the movable substrate, using an adjusting light source before mounting the light source, the adjusting device including: an adjusting light source fixing means that is attached to the concave mirror anchoring plate and fixes the center of a luminous part of the adjusting light source at a predetermined optical position with respect to the concave mirror.

According to this configuration, by placing the center of the luminous part of the adjusting light source at a predetermined optical position with the adjusting light source fixing means attached to the concave mirror anchoring plate of the light source apparatus, and adjusting the position of the movable substrate while observing the state of light from the adjusting light source condensed by the concave mirror, the position of the concave mirror in the light source apparatus can be adjusted properly. Thus, an adjusting device that easily can adjust the optical arrangement of the light source apparatus can be provided.

In the first adjusting device, it is preferable that the predetermined optical position is the first focal point of the concave mirror. According to this configuration, by adjusting the position of the movable substrate so that light from the adjusting light source placed at the first focal point of the concave mirror is condensed on a desired position, the position of the concave mirror in the light source apparatus can be adjusted properly. Thus, an adjusting device that easily can adjust an optical arrangement of the light source apparatus can be provided.

It is preferable that the first adjusting device includes a condensed state confirming means for observing the state of light emitted from the adjusting light source condensed by the concave mirror. According to this configuration, by adjusting the position of the movable substrate based on the condensed state observed by the condensed-state confirming means, the position of the concave mirror in the light source apparatus can be adjusted properly and easily.

In the first adjusting device, it is preferable that the condensed-state confirming means has a surface on which light is condensed, which is set perpendicularly to the optical axis of light emitted from the adjusting light source and reflected by the concave mirror. According to this configuration, because the surface on which the light reflected by the concave mirror is condensed is perpendicular to the optical axis, it has the advantage that the condensed state of light is easily confirmed.

In the first adjusting device, it is preferable that the surface is positioned and fixed on the bottom plate of the light source apparatus so that the surface is located at the position where the second focal point of the concave mirror should be placed. According to this configuration, by adjusting the position of the movable substrate so that the diameter of a light spot formed by light reflected by the concave mirror and condensed on the surface at a minimum, the position of the concave mirror in the light source apparatus can be adjusted properly and easily.

In the first adjusting device, it is preferable that the condensed-state confirming means is an optical sensor. Accordingly, the condensed state of the light emitted from the adjusting light source and reflected by the concave mirror can be observed quantitatively, so that there is an advantage that adjustment of high precision is possible.

In the first adjusting device, it is preferable that any of a tungsten lamp, a halogen lamp, a semiconductor laser light source, and an outgoing end of light-transmitting optical fiber is used as the adjusting light source. Accordingly, the luminous part of the adjusting light source approaches a point light source, and light is emitted radially from the luminous part, so that the center of the luminous part of the adjusting light source is placed easily at a predetermined optical position. Furthermore, because light from the adjusting light source is irradiated on a wide range of the reflection surface of the concave mirror, the condensed state of the entire concave mirror can be confirmed, so that it has the advantage that the precision of adjustment is improved.

In order to accomplish the above object, the present invention provides a second adjusting device for adjusting an optical arrangement, for a light source apparatus including a light source, a first concave mirror for condensing light emitted from the light source, a second concave mirror having a reflection surface opposing a reflection surface of the first concave mirror, a movable substrate that is set on a bottom plate of the light source apparatus and is movable in a traveling direction of light condensed by the first concave mirror, a first concave mirror anchoring plate for anchoring the first concave mirror to the movable substrate, and a second concave mirror anchoring plate that is attached to the first concave mirror anchoring plate and anchors the second concave mirror, using an adjusting light source before mounting the light source, the adjusting device including: an adjusting light source fixing means that is attached to the first concave mirror anchoring plate and fixes the adjusting light source movably so that the center of a luminous part of the adjusting light source is located at a predetermined optical position.

According to this configuration, by placing the center of the luminous part of the adjusting light source at a predetermined optical position, with the adjusting light source fixing means attached to the first concave mirror anchoring plate of the light source apparatus, and adjusting the position of the movable substrate while observing the condensed state of light from the adjusting light source, the position of the first concave mirror can be adjusted properly without changing relative positions of the first and second concave mirrors in the light source apparatus. Thus, an adjusting device that easily can adjust the optical arrangement of the light source apparatus can be provided.

In the second adjusting device, it is preferable that the predetermined optical position includes the first focal point of the first concave mirror and the position where the center of curvature of the second concave mirror should be placed. According to this configuration, when the center of the luminous part of the adjusting light source is placed at the first focal point of the first concave mirror, the position of the first concave mirror with respect to the bottom plate of the light source apparatus can be adjusted properly based on the condensed state of light from this adjusting light source. Furthermore, when the center of the luminous part of the adjusting light source is placed at the position where the center of curvature of the second concave mirror should be placed, relative positions of the first and second concave mirrors can be adjusted based on the condensed state of light from the adjusting light source. Thus, an adjusting device that properly can adjust the optical arrangement in the light source apparatus without using a large-scale device can be provided.

It is preferable that the second adjusting device includes a first condensed-state confirming means for observing the state of light emitted from the adjusting light source condensed by the first concave mirror. According to this configuration, by adjusting the position of the movable substrate based on the condensed state observed by the first condensed-state confirming means, the position of the first concave mirror in the light source apparatus can be adjusted properly and easily.

In the second adjusting device, it is preferable that the first condensed-state confirming means has a surface on which light is condensed, which is set perpendicularly to the optical axis of light emitted from the adjusting light source and reflected by the first concave mirror. According to this configuration, because the surface on which light reflected by the first concave mirror is condensed is perpendicular to the optical axis, it has the advantage that condensed state of light is easily confirmed.

In the second adjusting device, it is preferable that the surface of the first condensed-state confirming means is positioned and fixed on the bottom plate of the light source apparatus so that the surface is located at the position where the second focal point of the first concave mirror should be placed. According to this configuration, by adjusting the position of the movable substrate so that the diameter of the light spot formed by light reflected by the concave mirror and condensed on the surface is at a minimum, the position of the concave mirror in the light source apparatus can be adjusted properly and easily.

In the second adjusting device, it is preferable that the first condensed-state confirming means is an optical sensor. Accordingly, the condensed state of the light emitted from the adjusting light source and reflected by the concave mirror can be observed quantitatively, so that there is an advantage that adjustment with high precision is possible.

It is preferable that the second adjusting device includes a second condensed-state confirming means for observing the state of light emitted from the adjusting light source condensed by the second concave mirror. According to this configuration, by adjusting the position of the second concave mirror anchoring plate with respect to the first concave mirror anchoring plate based on the condensed state of light observed by the second condensed-state confirming means, relative positions of the first and second concave mirrors in the light source apparatus can be adjusted properly and easily.

In the second adjusting device, it is preferable that the second condensed-state confirming means has a surface on which light is condensed, which is set perpendicularly to the optical axis of light reflected by the first concave mirror. According to this configuration, because the surface on which light is condensed of the second condensed-state confirming means is perpendicular to the optical axis, it has the advantage that condensed state of light is easily confirmed.

In the second adjusting device, it is preferable that the surface of the second condensed-state confirming means is attached to the adjusting light source fixing means so that the surface is located at the position where the center of curvature of the second concave mirror should be placed. According to this configuration, by adjusting the fixed position of the second concave mirror anchoring plate with respect to the first concave mirror anchoring plate so that the diameter of the light spot formed on the surface on which light is condensed at a minimum, relative positions of the first and second concave mirrors in the light source apparatus can be adjusted properly and easily. Furthermore, because the surface on which light is condensed is attached to the adjusting light source fixing means, a mechanism only for fixing the surface is not required separately, so that it has the advantage that the adjusting device is simplified.

In the second adjusting device, it is preferable that the surface of the second condensed-state confirming means is placed within the vessel of the adjusting light source. According to this configuration, because the condensed state of light can be confirmed within the vessel, the condition in which the condensed state of light generated from the adjusting light source is a minimum spot can be detected accurately, so that it has the advantage that precision of adjustment is improved.

In the second adjusting device, it is preferable that any of a tungsten lamp, a halogen lamp, a semiconductor laser light source, and an outgoing end of light-transmitting optical fiber is used as the adjusting light source. Accordingly, the luminous part of the adjusting light source approaches a point light source, and light is emitted radially from the luminous part, so that the center of the luminous part of the adjusting light source is placed easily at a predetermined optical position. Furthermore, because light from the adjusting light source is irradiated on a wide range of the reflection surface of the concave mirror, the condensed state of the entire concave mirror can be confirmed, so that it has the advantage that precision of adjustment is improved.

In order to accomplish the above object, the present invention provides a first method for manufacturing a light source apparatus including a light source, a concave mirror for condensing light emitted from the light source, a movable substrate that is set on a bottom plate of the light source apparatus and is movable in a traveling direction of light condensed by the concave mirror, and a concave mirror anchoring plate for anchoring the concave mirror to the movable substrate, the method comprising: mounting the movable substrate on the bottom plate; attaching the concave mirror anchoring plate to the movable substrate; mounting an adjusting light source so that the center of a luminous part of the adjusting light source is located at a first optical basis position with respect to the concave mirror attached to the concave mirror anchoring plate; placing a condensed-state confirming means for observing a state of light condensed by the concave mirror at a second optical basis position; adjusting the position of the movable substrate on the bottom plate so that the condensed state of light observed by the condensed-state confirming means is optimum; and removing the adjusting light source and mounting the light source so that the center of a luminous part of the light source coincides with the position where the center of the luminous part of the adjusting light source has been located.

According to this method, the position of the concave mirror in the light source apparatus can be adjusted properly and easily only by adjusting the position of the movable substrate using the adjusting light source while observing the condensed state of light from the adjusting light source with the condensed-state confirming means before attaching the light source to the light source apparatus. Furthermore, after removing the adjusting light source, the position of the light source also is adjusted properly by mounting the light source so that the center of the luminous part of the light source coincides with the center of the luminous part of the adjusting light source. Accordingly, the optical arrangement can be adjusted without requiring a large-scale device, and a light source apparatus having high efficiency of utilizing light from the light source can be manufactured easily.

In the first method, it is preferable that the first optical basis position is the first focal point of the concave mirror. Accordingly, the optical arrangement of the concave mirror and the light source can be adjusted so that efficiency of utilizing light from the light source is at a maximum.

In the first method, it is preferable that the second optical basis position is the position where the second focal point of the concave mirror should be placed. Accordingly, by adjusting the position of the movable substrate so that the diameter of the light spot formed by light reflected by the concave mirror is minimized, the position of the concave mirror in the light source apparatus can be adjusted properly and easily.

In the first method, it is preferable that the position of the movable substrate is adjusted by a process including: moving the movable substrate to such a position that the diameter of the light spot observed by the condensed-state confirming means is at a minimum and fixing the movable substrate at the position; adjusting the fixed position of the concave mirror with respect to the concave mirror anchoring plate so that the position of the light spot approaches the second optical basis position; and again, moving the movable substrate to such a position that the diameter of the light spot observed by the condensed-state confirming means is at a minimum and fixing the movable substrate at the position. Accordingly, the position of the concave mirror with respect to the bottom plate of the light source apparatus and the position of the concave mirror with respect to the concave mirror anchoring plate can be adjusted properly and easily.

In order to accomplish the above object, the present invention provides a second method for manufacturing a light source apparatus including a light source, a first concave mirror for condensing light emitted from the light source, a second concave mirror having a reflection surface opposing a reflection surface of the first concave mirror, a movable substrate that is set on a bottom plate of the light source apparatus and is movable in a traveling direction of light condensed by the first concave mirror, a first concave mirror anchoring plate for anchoring the first concave mirror to the movable substrate, and a second concave mirror anchoring plate that is attached to the first concave mirror anchoring plate and anchors the second concave mirror, the method comprising: mounting the movable substrate on the bottom plate; attaching the first concave mirror anchoring plate to the movable substrate; attaching the second concave mirror anchoring plate to the first concave mirror anchoring plate; mounting an adjusting light source so that the center of a luminous part of the adjusting light source is located at a first optical basis position with respect to the first concave mirror attached to the first concave mirror anchoring plate; placing a first condensed-state confirming means for observing a state of light from the adjusting light source condensed by the first concave mirror at a second optical basis position; adjusting the position of the movable substrate on the bottom plate so that the condensed state of light observed by the first condensed-state confirming means is optimum; moving the adjusting light source so that the center of the luminous part of the adjusting light source is located at a third optical basis position with respect to the second concave mirror; placing the second condensed-state confirming means for observing a state of light condensed by the second concave mirror at a fourth optical basis position; adjusting the position of the second concave mirror anchoring plate with respect to the first concave mirror anchoring plate so that the condensed state of light observed by the second condensed-state confirming means is optimum; and removing the adjusting light source and mounting the light source so that the center of the luminous part of the light source coincides with the first optical basis position.

According to this method, the positions of the first and second concave mirrors in the light source apparatus can be adjusted properly and easily only by adjusting the position of the movable substrate using the adjusting light source while observing the condensed state of light from the adjusting light source with the first condensed-state confirming means before attaching the light source to the light source apparatus, and after moving the adjusting light source, further adjusting relative positions of the first and second concave mirror anchoring plates while observing the condensed state of light from the adjusting light source with the second condensed-state confirming means. Furthermore, after removing the adjusting light source, the position of the light source also is adjusted properly by mounting the light source so that the center of the luminous part of the light source coincides with the center of the luminous part of the adjusting light source. Accordingly, the optical arrangement can be adjusted without requiring a large-scale device, and a light source apparatus having high efficiency of utilizing light from the light source can be manufactured easily.

In the second method, it is preferable that the first optical basis position is the first focal point of the first concave mirror. Accordingly, the optical arrangement of the first concave mirror and the light source can be adjusted so that efficiency of utilizing light from the light source is at a maximum.

In the second method, it is preferable that the second optical basis position is the position where the second focal point of the first concave mirror should be placed. Accordingly, by adjusting the position of the movable substrate so that the diameter of the light spot formed at the second optical basis position by light reflected by the first concave mirror is at a minimum, the position of the first concave mirror in the light source apparatus can be adjusted properly and easily.

In the second method, it is preferable that the third optical basis position is the position where the center of curvature of the second concave mirror should be placed. Accordingly, using one adjusting light source, not only the positions of the first and second concave mirrors with respect to the bottom plate of the light source apparatus, but also the position of the second concave mirror with respect to the first concave mirror can be adjusted properly and easily.

In the second method, it is preferable that the fourth optical basis position is the first focal point of the first concave mirror. Accordingly, the relative positions of the first and second concave mirrors can be adjusted so that light from the light source may be utilized with highest efficiency.

In the second method, it is preferable that the position of the movable substrate is adjusted by a process including: moving the movable substrate to such a position that the diameter of the light spot observed by the first condensed-state confirming means is at a minimum and fixing the movable substrate at the position; adjusting the fixed position of the first concave mirror with respect to the first concave mirror anchoring plate so that the position of the light spot approaches the position where the second focal point of the first concave mirror should be placed; and again, moving the movable substrate to such a position that the diameter of the light spot observed by the first condensed-state confirming means is at a minimum and fixing the movable substrate at the position. Accordingly, the position of the first concave mirror with respect to the bottom plate of the light source apparatus and the position of the first concave mirror with respect to the first concave mirror anchoring plate can be adjusted properly and easily.

In the second method, it is preferable that the position of the second concave mirror anchoring plate with respect to the first concave mirror anchoring plate is adjusted by a process including: moving the second concave mirror anchoring plate in parallel with the optical axis of light reflected by the first concave mirror and fixing the second concave mirror anchoring plate so that the diameter of the light spot observed by the second condensed-state confirming means is at a minimum; adjusting the fixed position of the second concave mirror with respect to the second concave mirror anchoring plate so that the position of the light spot approaches the fourth optical basis position; and again, moving the second concave mirror anchoring plate in parallel with the optical axis of light reflected by the first concave mirror and fixing the second concave mirror anchoring plate so that the diameter of the light spot observed by the second condensed-state confirming means is at a minimum. Accordingly, the position of the second concave mirror with respect to the first concave mirror can be adjusted properly and easily.

BRIEF DESCRIPTION OF THE DRAWINGS

FIG. 8 is a sectional view taken along the line A—A of FIG. 7.

BEST MODE FOR CARRYING OUT THE INVENTION

First Embodiment

Figure 1:
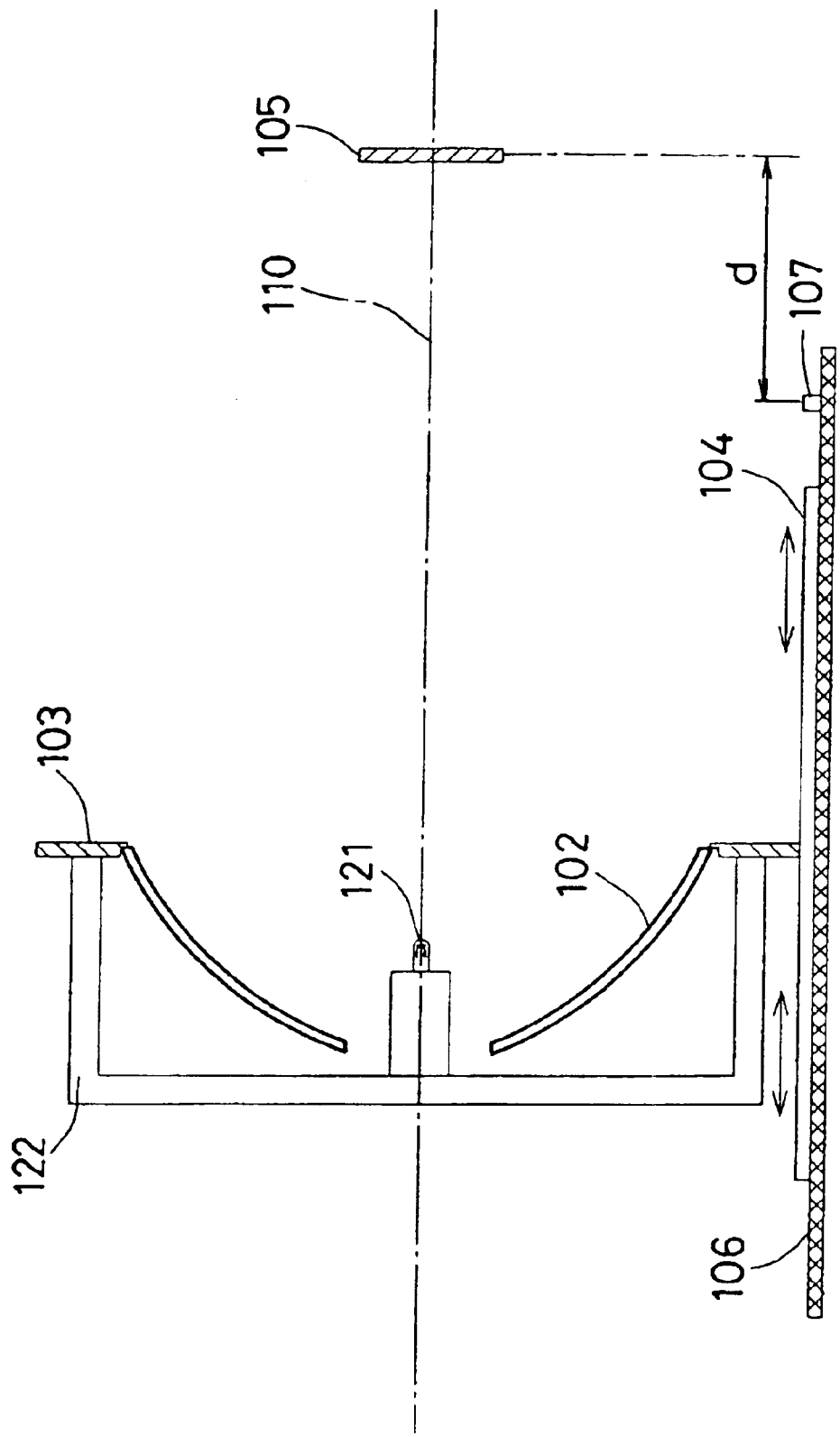
FIG. 1 is a sectional view showing a condition in which an optical arrangement of a lamp housing is adjusted using an adjusting device in a first embodiment of the present invention.

One embodiment of the present invention is described referring to the drawings.

Figure 3:
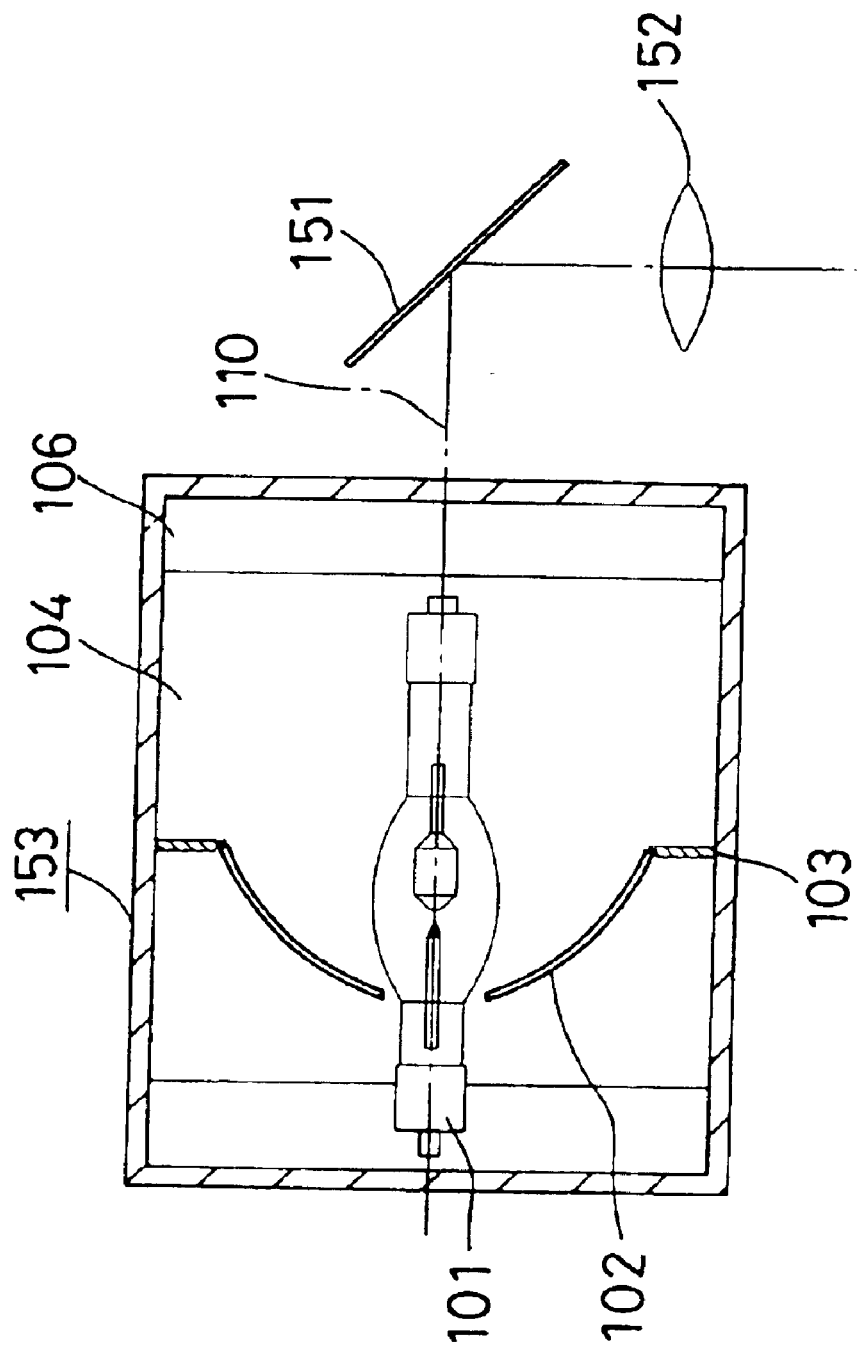
FIG. 3 is a sectional view showing a schematic configuration of a lighting system according to the first embodiment.
Figure 4:
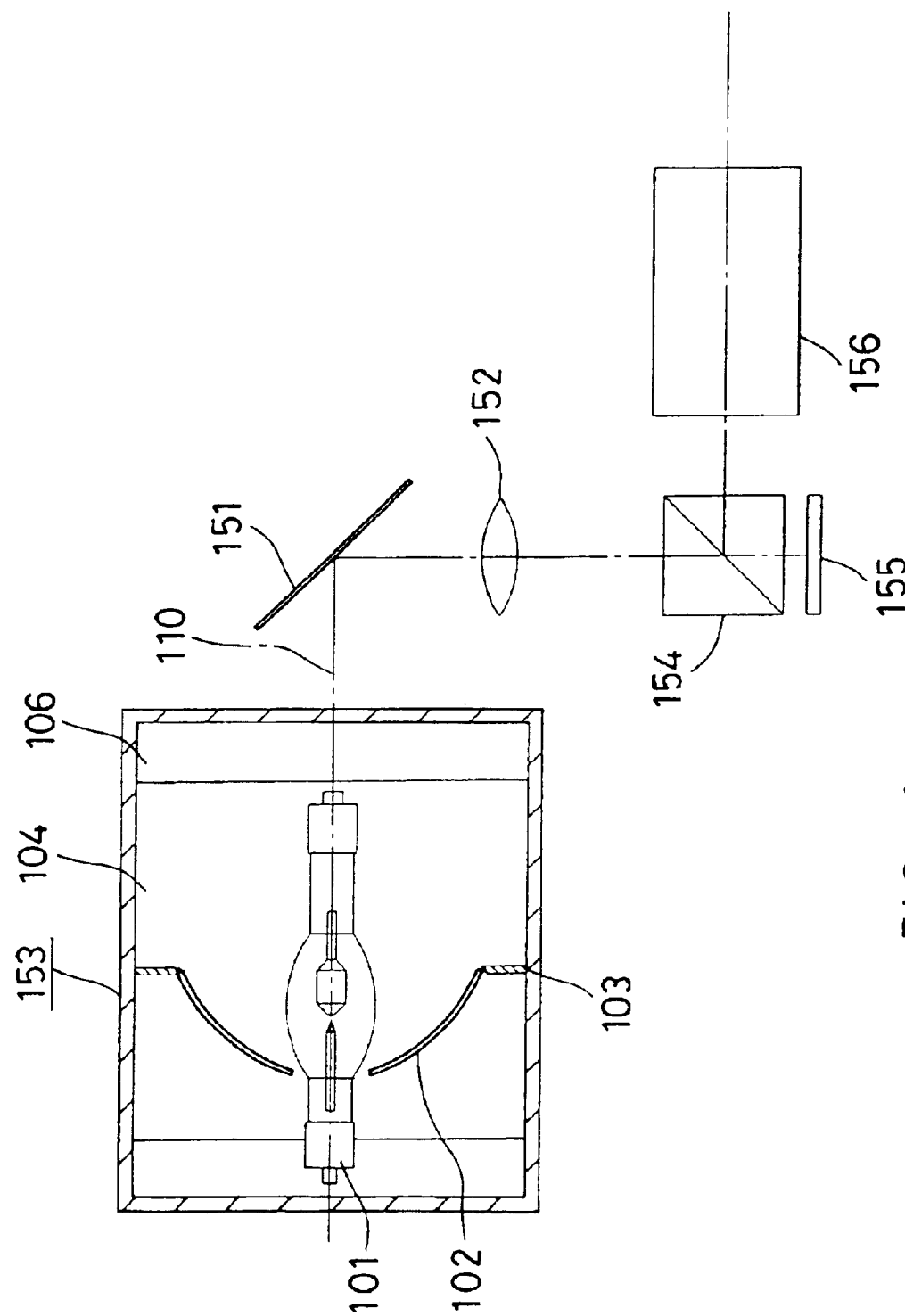
FIG. 4 is a sectional view showing a schematic configuration of a projection display system according to the first embodiment.

FIGS. 3 and 4 show schematic configurations of a lighting system and a projection display system according to this embodiment, respectively. These lighting system and projection display system include a removable lamp housing 153 (light source apparatus). For example, when an arc lamp 101 (light source) within the lamp housing 153 is exhausted, the assembly of the lamp housing 153 is exchanged.

As the arc lamp 101, a xenon lamp that has an arc shape very close to a point light source and is capable of large light output, a metal halide lamp that is excellent in luminous efficacy, a mercury lamp that has extra-high voltage within its arc tube during lighting, and the like may be used.

Within the lamp housing 153, an ellipsoidal mirror 102 (concave mirror) is fixed by an ellipsoidal mirror anchoring plate 103. Furthermore, a lower end of the ellipsoidal mirror anchoring plate 103 is fixed to a base substrate 104 (movable substrate).

That is, the ellipsoidal mirror 102 and the ellipsoidal mirror anchoring plate 103 can change their relative positions with respect to a bottom plate 106 of the lamp housing 153 without changing their relative positions with respect to the base substrate 104.

Figure 5:
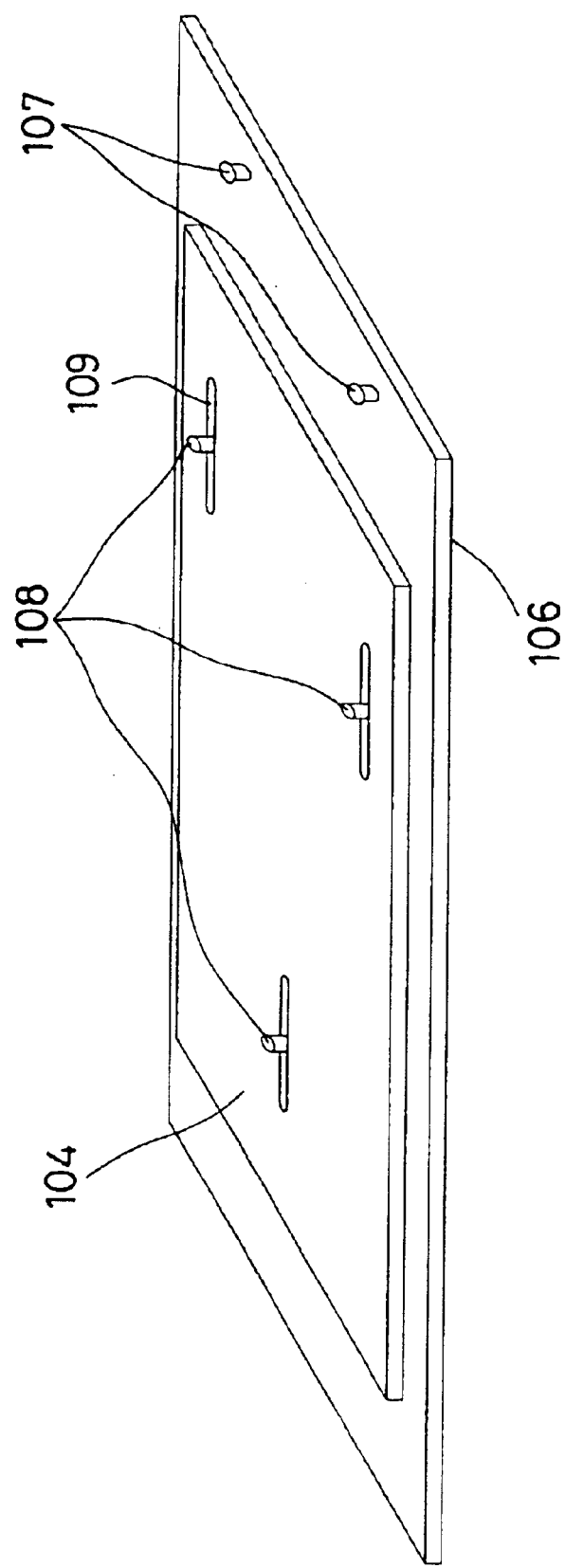
FIG. 5 is a perspective view showing a configuration of a bottom plate and a base substrate of the lamp housing according to the first embodiment.

Moreover, as shown in FIG. 5, although the base substrate 104 is fixed to the bottom plate 106 of the lamp housing 153 with screws 108 when a lighting system or a projection display system is completed, as described below, when adjusting the optical arrangement at the manufacturing stage, the base substrate 104 is arranged so that it slides with respect to the bottom plate 106.

Now, adjustment of the optical arrangement at the stage of manufacturing the lighting system or the projection display system will be described.

First, the necessity of the adjustment of the optical arrangement is explained. In the ellipsoidal mirror 102 within the lamp housing 153, because of the irregularity in the open shape and the mirror surface shape, etc., the actual distances of the first and second focal points with respect the open surface on the side of the ellipsoidal mirror 102 for condensing light may have an error with respect to design values, i.e., dimensional tolerance.

The dimensional tolerance is between about 0.1 mm and 0.5 mm for the distance from the open surface to the first focal point. As shown in the above Table 1, when there is a dimensional tolerance of 0.5 mm, light output is decreased by as much as 14%.

Thus, as described above, when the lamp housing 153 is exchanged due to exhaustion of the arc lamp 101, etc. or when the lamp housing 153 is newly manufactured, to utilize the light of the arc lamp 101 effectively, it is necessary to adjust the positions of the arc lamp 101 and the ellipsoidal mirror 102 with respect to an optical member such as a cold mirror 151, etc. other than the lamp housing 153, taking the above-mentioned error into account.

Therefore, in this embodiment, the optical arrangement is adjusted using the following adjusting device. The adjusting device of this embodiment can adjust the lamp housing 153 as a single unit before being incorporated in a lighting system or a projection display system. As shown in FIG. 1, the adjusting device has an ellipsoidal mirror condensed-state confirming surface 105 (condensed-state confirming means), a tungsten lamp 121 (adjusting light source), and a tungsten lamp anchoring plate 122.

The tungsten lamp 121 is fixed to the tungsten lamp anchoring plate 122. The tungsten lamp 121 and the tungsten lamp anchoring plate 122 are mounted to the ellipsoidal mirror 102 and the ellipsoidal mirror anchoring plate 103 before assembly with the arc lamp 101.

In the light source apparatus used in a lighting system or a projection display system, a lamp of high output and high luminance is often used for the arc lamp 101 as a light source. Therefore, if this arc lamp 101 itself is used in the adjustment, there are high risks of breaking the lamp or damaging the eyes of the operator during the adjustment, and there is also a problem that the arc lamp 101 is exhausted and its product value is destroyed. Thus, to avoid these problems, during the adjustment, a tungsten lamp 121 is used as an adjusting light source instead of the arc lamp 101.

The shape of the tungsten lamp anchoring plate 122 may be arbitrary, as long as it is configured so that the center of the luminous part of the tungsten lamp 121 is fixed at a predetermined position with respect to the ellipsoidal mirror 102 by fixing the tungsten lamp anchoring plate 122 to the ellipsoidal mirror anchoring plate 103.

In this embodiment, an end of the tungsten lamp anchoring plate 122 is attached to the ellipsoidal mirror anchoring plate 103 so that the center of the luminous part of the tungsten lamp 121 coincides with the first focal point of the ellipsoidal mirror 102. In this way, by making the center of the luminous part of the tungsten lamp 121 coincide with the first focal point of the ellipsoidal mirror 102, light from the tungsten lamp 121 on the optical axis 110 can be condensed on the side of the second focal point most effectively.

Furthermore, the optical arrangement is adjusted with this adjusting device under the condition in which the side plates and the top plate of the lamp housing 153 are not present. Also, the base substrate 104 is under the condition of being capable of sliding without being fixed on the bottom plate 106 of the lamp housing 153 so that it moves in parallel with the optical axis 110 of the ellipsoidal mirror 102.

That is, in the base substrate 104, grooves 109 for fitting screws 108 are formed in parallel with the optical axis 110, and when adjusting the optical arrangement, the base substrate 104 slides on the bottom plate 106 by loosening the screws 108. Accordingly, the ellipsoidal mirror 102, the ellipsoidal mirror anchoring plate 103, the tungsten lamp 121, and the tungsten lamp anchoring plate 122 that are fixed on the base substrate 104, can slide on the bottom plate 106 without changing their relative positions. Furthermore, after adjusting the optical arrangement, the base substrate 104 is fixed to the bottom plate 106 by tightening the screws 108.

Furthermore, the ellipsoidal mirror condense-state confirming surface 105 is placed on the optical axis 110 perpendicularly to the optical axis 110 and at a predetermined distance with respect to the bottom plate 106 of the lamp housing 153 fixed to the adjusting device. In this embodiment, as shown in FIGS. 1 and 5, a positioning pin 107 is set to the bottom plate 106, and the ellipsoidal mirror condense-state confirming surface 105 is placed using an appropriate jig (not shown) so that its distance from the positioning pin 107 is a predetermined distance d.

With respect to the positioning pin 107, the distance from an end of the bottom plate 106 to the center of the pin is specified accurately. Furthermore, the distance d is determined so that the ellipsoidal mirror condense-state confirming surface 105 is placed at the position that should be the second focal point of the ellipsoidal mirror 102. The "the position that should be the second focal point" is, in other words, in a lighting system or a projection display system in which the lamp housing 153 is mounted, the position on which light from the arc lamp 101 should be condensed into a light spot of minimum diameter by the ellipsoidal mirror 102 so that the optical system outside the lamp housing 153 can utilize the light from the arc lamp 101 most effectively.

Figure 6:
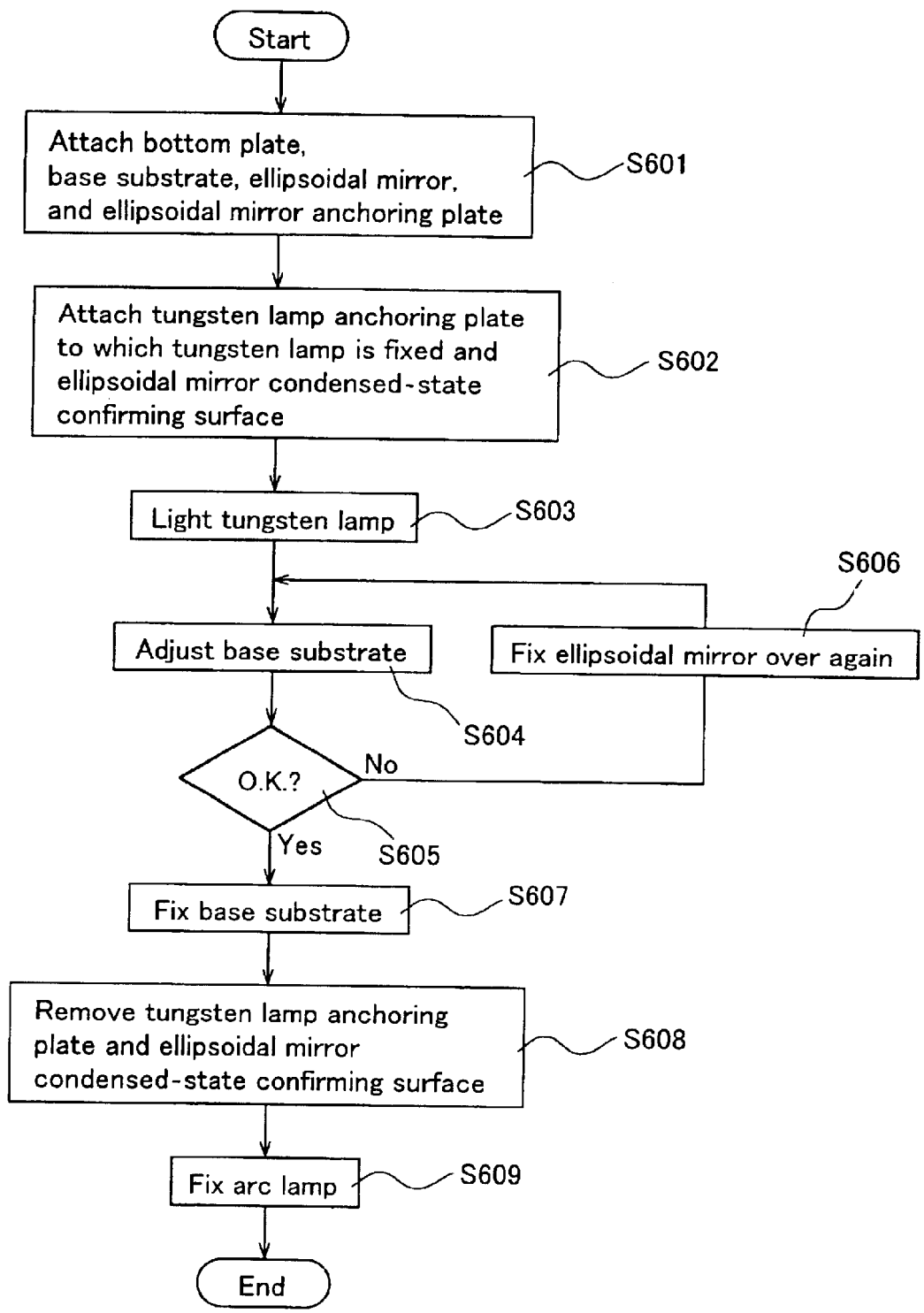
FIG. 6 is a flowchart showing a procedure for adjusting the optical arrangement of the lamp housing in the first embodiment.

In the following, referring to FIG. 6, the procedure for adjusting the optical arrangement using this adjusting device will be described.

First, as described above, the base substrate 104 is attached to the bottom plate 106 of the lamp housing 153. Then, the ellipsoidal mirror anchoring plate 103 to which the ellipsoidal mirror 102 is fixed is attached to the base substrate 104 (S601).

Then, the tungsten lamp anchoring plate 122 to which the tungsten lamp 121 of the adjusting device is fixed is set to the ellipsoidal mirror anchoring plate 103 before assembly with the arc lamp 101, and the ellipsoidal mirror condensed-state confirming surface 105 is placed at a predetermined distance d from the positioning pin 107 of the bottom plate 106 of the lamp housing 153 (S602).

Then, the tungsten lamp 121 is lighted (S603), and adjustment is carried out by moving the base substrate 104 on the bottom plate 106 in parallel with the optical axis 110 so that light from the tungsten lamp 121 is condensed into a light spot of minimum diameter on the ellipsoidal mirror condensed-state confirming surface 105 by the ellipsoidal mirror 102 (S604).

At this time, the position of the second focal point in the plane of the ellipsoidal mirror condensed-state confirming surface 105 also is adjusted (S605, S606). That is, a mark is put in advance on the position where the second focal point should be placed (not shown) in the plane of the ellipsoidal mirror condensed-state confirming surface 105. When the center of the light spot is greatly different from the position of the mark, the ellipsoidal mirror 102 is once removed from the ellipsoidal mirror anchoring plate 103, and is fixed again so that the center of the light spot approaches the mark. When the center of the light spot coincides with the mark, the adjustment of S604 is carried out again.

Figure 7:
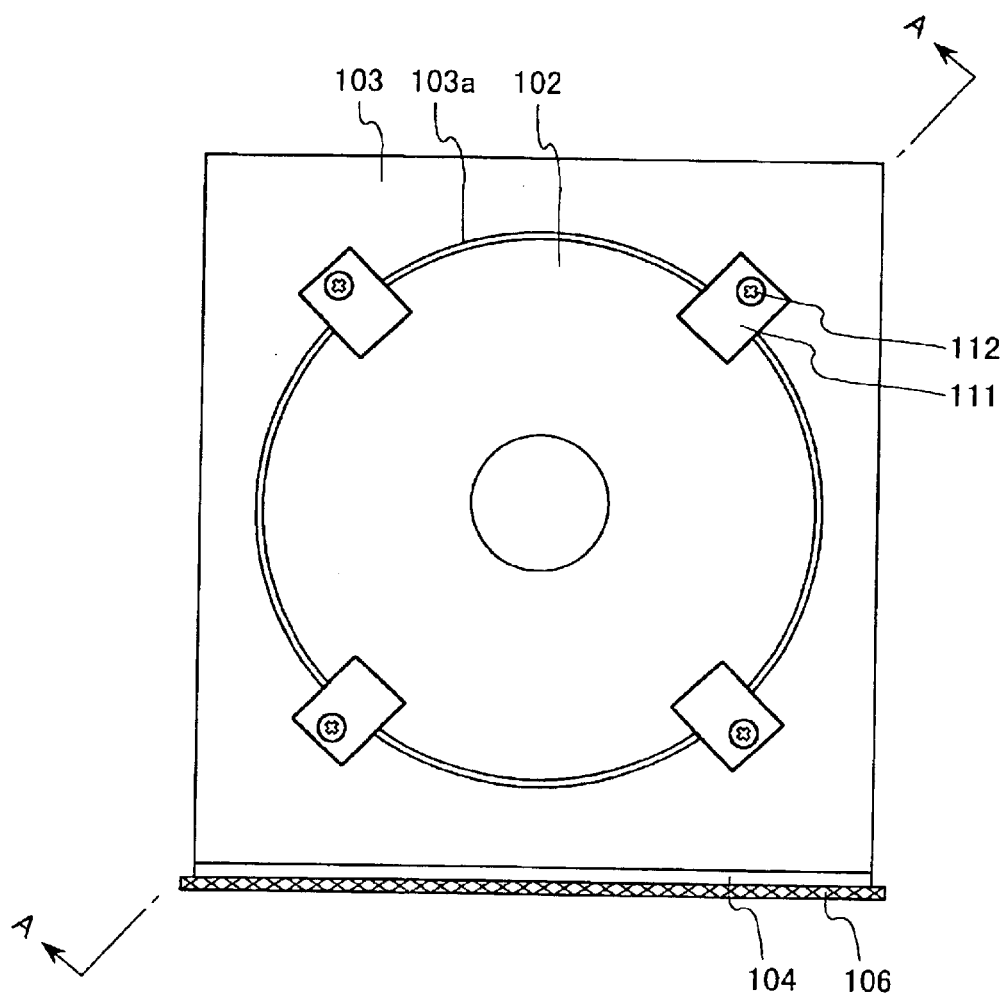
FIG. 7 is a plan view showing a configuration for fixing an ellipsoidal mirror to an ellipsoidal mirror anchoring plate in the lamp housing according to the first embodiment.

Furthermore, an example of a configuration for making the fixed position of the ellipsoidal mirror 102 adjustable with respect to the ellipsoidal mirror anchoring plate 103 in S606 is shown in FIG. 7. FIG. 7 is a drawing viewed from the back side of the ellipsoidal mirror anchoring plate 103 to which the ellipsoidal mirror 102 is attached. As shown in FIG. 7, a circular opening 103a is formed in the ellipsoidal mirror anchoring plate 103 so that it matches the open shape of the ellipsoidal mirror 102. Plate springs 111 of stainless steel are mounted at four positions on the circumference of the opening 103a with screws 112.

As shown in FIG. 8, the plate springs 111 are applied to the back surface of the ellipsoidal mirror 102, and with the forces of the plate springs 111 for returning to their normal shapes, the ellipsoidal mirror 102 is pushed against the ellipsoidal mirror anchoring plate 103 and fixed. By loosening the screws 112, the forces of the plate springs 111 for pushing the ellipsoidal mirror 102 against the ellipsoidal mirror anchoring plate 103 are weakened, and this permits adjustment of the position of the ellipsoidal mirror 102 with respect to the ellipsoidal mirror anchoring plate 103.

If the thickness of the plate springs 111 is too large, the forces of the plate springs 111 for returning to their normal shapes are too strong, so that the ellipsoidal mirror 102 may be subject to damages such as cracks when the ellipsoidal mirror 102 is fixed to the ellipsoidal mirror anchoring plate 103 with the screws 112, or when the ellipsoidal mirror 102 expands with heat during lighting of the arc lamp 101.

On the other hand, if the thickness of the plate springs 111 is too small, the forces of the plate springs 111 for returning to their normal shapes are too weak, so that the ellipsoidal mirror 102 will move easily, even if it is fixed to the ellipsoidal mirror anchoring plate 103 with the screws 112. Thus, the position of the ellipsoidal mirror 102 with respect to the ellipsoidal mirror anchoring plate 103 may be changed by the impact during transportation, etc., so that readjustment may be required.

As shown in Table 2, when a borosilicate glass ellipsoidal mirror of about 200 mm in outermost diameter, 61.5 mm in height, and from 3 to 4 mm in glass thickness is used as the ellipsoidal mirror 102, it is desirable that the thickness of the plate springs 111 is greater than 0.2 mm, but is smaller than 0.5 mm.

TABLE 2

| Thickness of plate springs | Capability of use | Reason |
|---|---|---|
| 0.1 mm | X | The pushing forces of the plate springs are so weak that the ellipsoidal mirror can be moved easily by hand. |
| 0.2 mm | X | The pushing forces of the plate springs are stronger than those in the case of 0.1 mm thickness, but they are a little insufficient. |
| 0.3 mm | ◯ | OK |
| 0.4 mm | ◯ | OK |
| 0.5 mm | X | The pushing forces of the plate springs are so strong that the glass is damaged during lighting of the arc lamp. |

Note:
A borosilicate glass ellipsoidal mirror of about φ200 mm in outermost diameter, about 61.5 mm in height, and 3 to 4 mm in glass thickness is used.

Although a configuration including four plate springs 111 is illustrated in FIG. 7, the position where attached, the shape and the number of the plate springs are arbitrary, as long as satisfying the condition that the ellipsoidal mirror 102 can be fixed firmly to the ellipsoidal mirror anchoring plate 103.

After completing the adjustment of S604 to S606 above, the base substrate 104 is fixed to the bottom plate 106 with screws 108 at such a position that light from the tungsten lamp 121 is condensed into a light spot of minimum diameter by the ellipsoidal mirror 102 (S607). Accordingly, the ellipsoidal mirror 102 is fixed under the condition in which error of the position of the second focal point due to irregularity in the open shape and the mirror surface shape of the ellipsoidal mirror 102, etc. is corrected.

Figure 2:
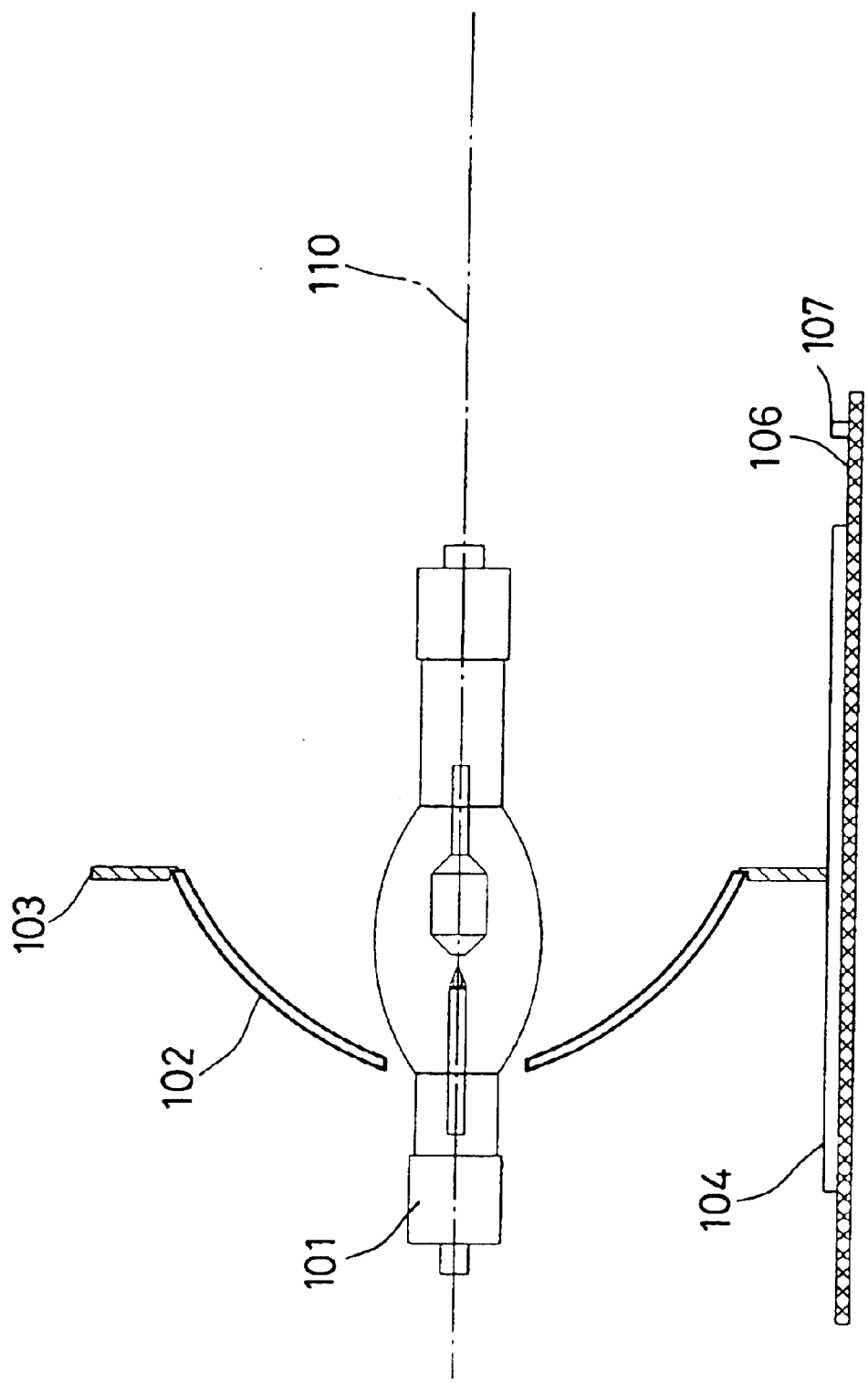
FIG. 2 is a sectional view showing a condition in which the adjusting device is removed from the lamp housing in which the optical arrangement has been adjusted using the adjusting device, and an arc lamp is mounted, in the first embodiment.

Thereafter, the tungsten lamp 121 and the tungsten lamp anchoring plate 122 are removed (S608), and as shown in FIG. 2, the arc lamp 101 is assembled with the ellipsoidal mirror 103 using an arc lamp anchoring plate (not shown) so that the arc center of the arc lamp 101 coincides with the position where the luminous center of the tungsten lamp 121 has been located, that is, the first focal point of the ellipsoidal mirror 102 (S609).

Thus, by making the arc center of the arc lamp 101 coincide with the first focal point of the ellipsoidal mirror 102, light emitted from the arc lamp 101 can be condensed on the second focal point of the ellipsoidal mirror 102 most effectively.

Then, by attaching side plates and a top plate to the bottom plate 106, the lamp housing 153 is completed. Furthermore, as shown in FIG. 3, by placing the cold mirror 151 and a lens 152 (optical means) at predetermined positions with respect to the lamp housing 153, a lighting system according to this embodiment is completed.

Because FIG. 3 represents a cross section of the lamp housing 153, etc. cut in a plane containing the optical axis of the ellipsoidal mirror 102 and parallel to the base substrate 104, the top plate of the lamp housing 153 does not appear in this drawing.

The cold mirror 151 and the lens 152 in the lighting system play roles of converting the traveling direction of light condensed by the ellipsoidal mirror 102 within the lamp housing 153, as well as converting the light into approximately parallel light.

Furthermore, as shown in FIG. 4, a projection display system can be obtained by additionally providing a beam splitter 154, an optical modulator 155, and a projection lens 156 to the lighting system, in the traveling direction of the light emitted from the arc lamp 101, reflected by the cold mirror 151, and passed through the lens 152. In the same way as FIG. 3, because FIG. 4 also represents a cross section of the lamp housing 153, etc. that is cut in a plane containing the optical axis of the ellipsoidal mirror 102 and parallel to the base substrate 104, the top plate of the lamp housing 153 does not appear in this drawing.

As the optical modulator 155 included in the lighting system, a reflection type light valve, a transmission type light valve, or an optical modulator of optical writing system, etc. may be used.

As mentioned above, according to this embodiment, the optical arrangement of the ellipsoidal mirror 102 and the arc lamp 101 within the lamp housing 153 can be adjusted properly by adjusting the position of the base substrate 104 on the bottom plate 106 of the lamp housing 153 using the tungsten lamp 121 and the ellipsoidal mirror condensed-state confirming surface 105 before combining the arc lamp 101. Accordingly, the lamp housing 153 as a single unit can be adjusted by a simple procedure without requiring a large-scale adjusting device so that light from the arc lamp 101 is utilized with highest efficiency.

Furthermore, this way, by having the lamp housing 153 adjusted so that light is utilized with highest efficiency, a bright lighting system and projection display system can be provided.

Although a configuration using the tungsten lamp 121 as a light source of the adjusting device has been illustrated in the above description, a halogen lamp, a semiconductor laser light source, or an outgoing end of light-transmitting optical fiber, etc. other than a tungsten lamp also may be used.

Furthermore, when higher precision of adjustment is required, an optical sensor such as a CCD camera or a photodiode may be used as the ellipsoidal mirror condensed-state confirming surface 105.

Furthermore, although the lens 152 as a single lens is illustrated in FIGS. 3 and 4, combined optical members such as a plurality of lenses, etc. also may be employed.

Furthermore, although a configuration including only one optical modulator 155 is illustrated in FIG. 4, a configuration including a plurality of optical modulators also may be employed.

Second Embodiment

Another embodiment of the present invention will be described referring to the drawings. The same signs are applied to the structures having the same functions as the structures described in the first embodiment, and detailed descriptions thereof are omitted.

Figure 9:
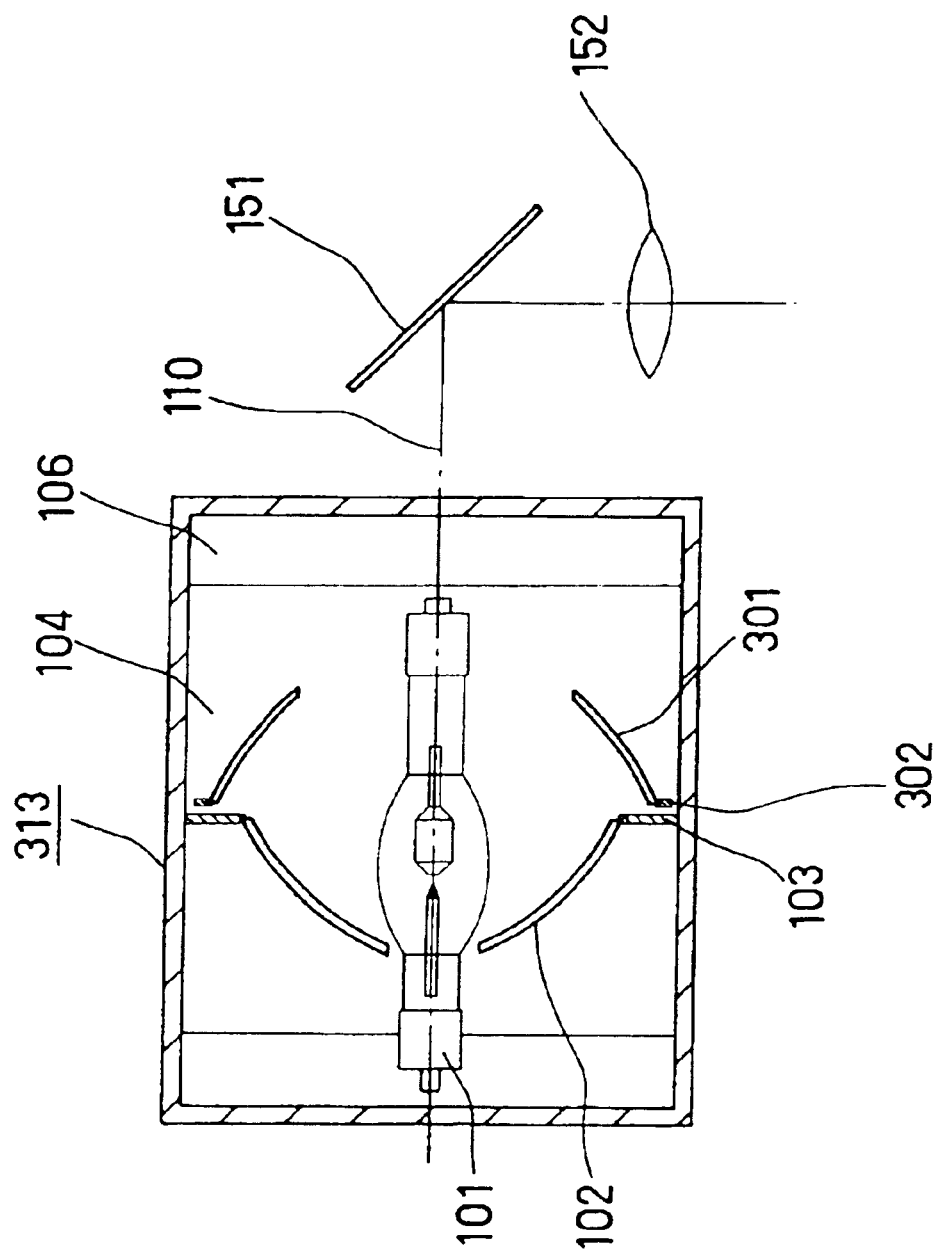
FIG. 9 is a sectional view showing a schematic configuration of a lighting system according to a second embodiment of the present invention.
Figure 10:
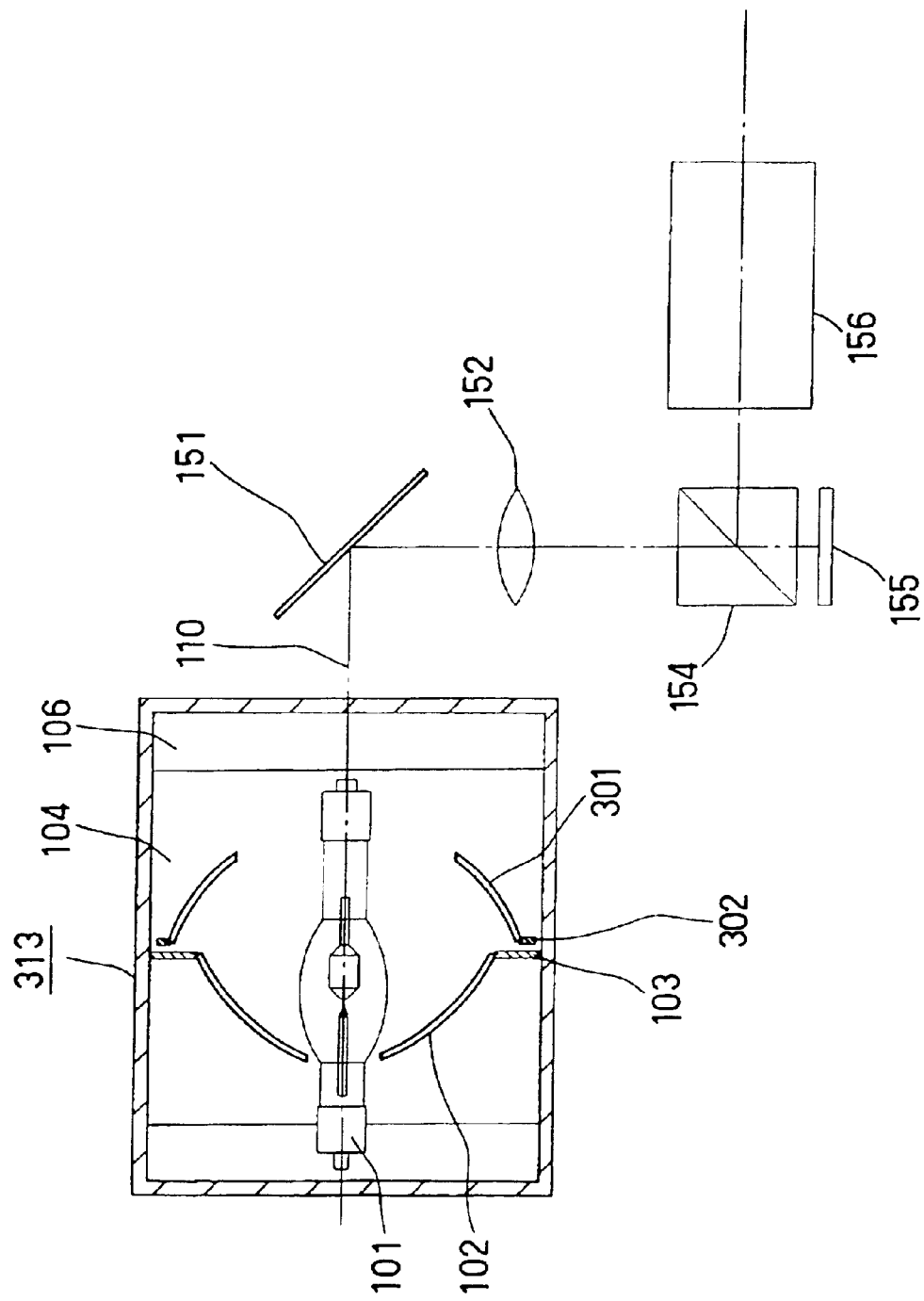
FIG. 10 is a sectional view showing a schematic configuration of a projection display system according to the second embodiment.

FIGS. 9 and 10 show schematic configurations of a lighting system and a projection display system according to the present invention, respectively.

The lighting system and the projection display system of this embodiment includes a removable lamp housing 313 (light source apparatus). For example, when the arc lamp 101 (light source) within the lamp housing 313 is exhausted, the assembly of the lamp housing 313 is exchanged.

Within the lamp housing 313, an ellipsoidal mirror 102 (first concave mirror) and a spherical mirror 301 (second concave mirror) are further provided. The ellipsoidal mirror 102 is fixed within the lamp housing 313 by the ellipsoidal mirror anchoring plate 103. The lower end of the ellipsoidal mirror anchoring plate 103 is fixed to the base substrate 104. The spherical mirror 301 is fixed to a spherical mirror anchoring plate 302.

In the same way as the configuration described in the first embodiment, although the base substrate 104 is fixed to the bottom plate 106 of the lamp housing 313 with screws 108 when a lighting system or a projection display system is completed, as described below, when adjusting the optical arrangement at the manufacturing stage, the base substrate 104 slides with respect to the bottom plate 106. Furthermore, as described above, although the spherical mirror anchoring plate 302 also is fixed to the ellipsoidal mirror anchoring plate 103 when a lighting system or a projection display system is completed, as described below, when adjusting the optical arrangement, it is configured as needed so that the spherical mirror anchoring plate 302 is separated from the ellipsoidal mirror anchoring plate 103 and is movable.

Figure 11:
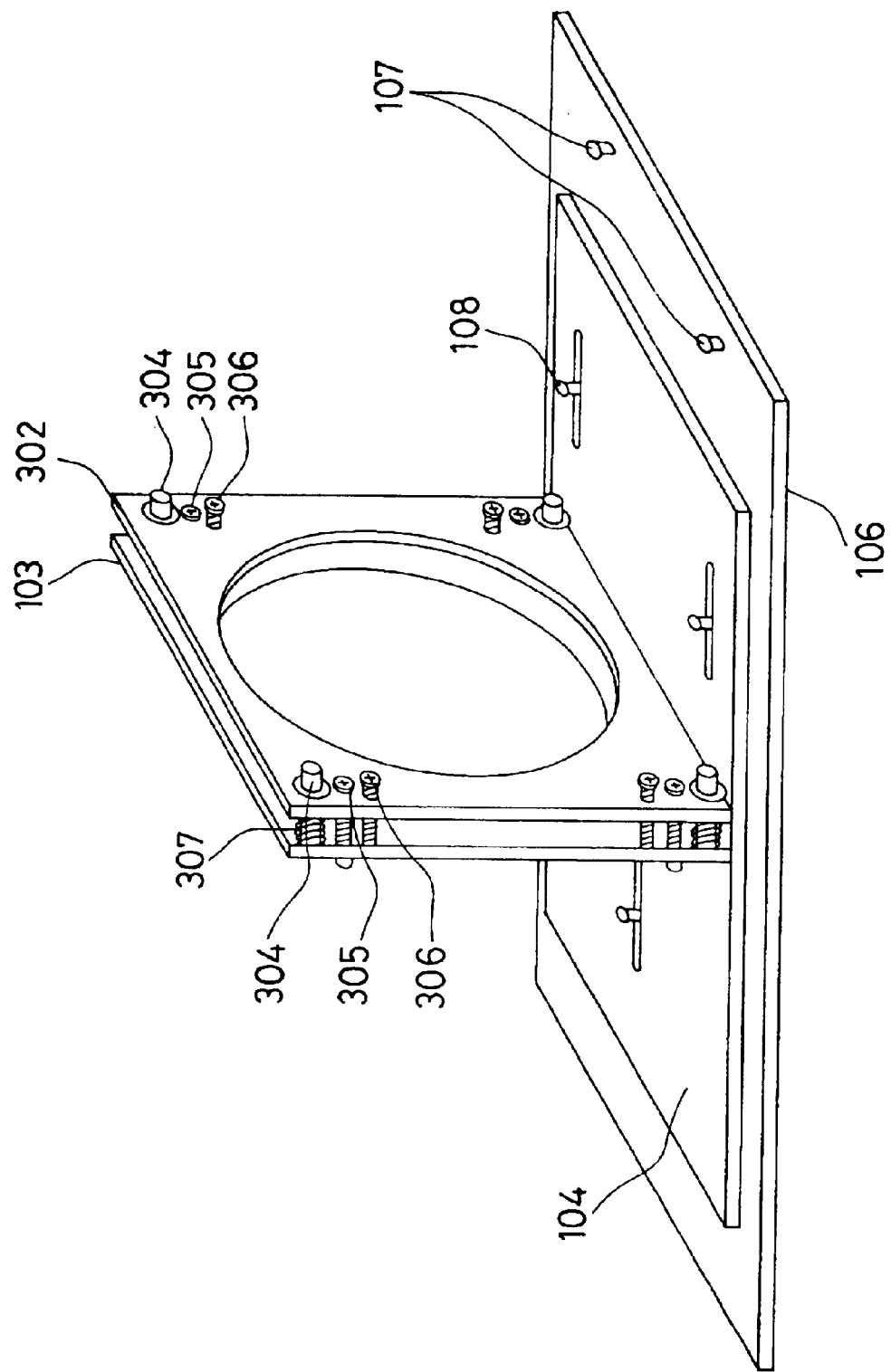
FIG. 11 is a perspective view showing a configuration in which an ellipsoidal mirror anchoring plate and a spherical mirror anchoring plate are fixed in a lamp housing according to the second embodiment.

As shown in FIG. 11, the spherical mirror anchoring plate 302 is fixed to the ellipsoidal mirror anchoring plate 103 with fixing screws 306 (anchoring plate fixing means) set at its four corners. In the vicinities of the fixing screws 306, guides 304 and space adjusting screws 305 (anchoring plate position adjusting means) are provided. The guides 304 and the space adjusting screws 305 are used, as described below, when adjusting the relative positions of the ellipsoidal mirror anchoring plate 103 and the spherical mirror anchoring plate 302.

Figure 12:
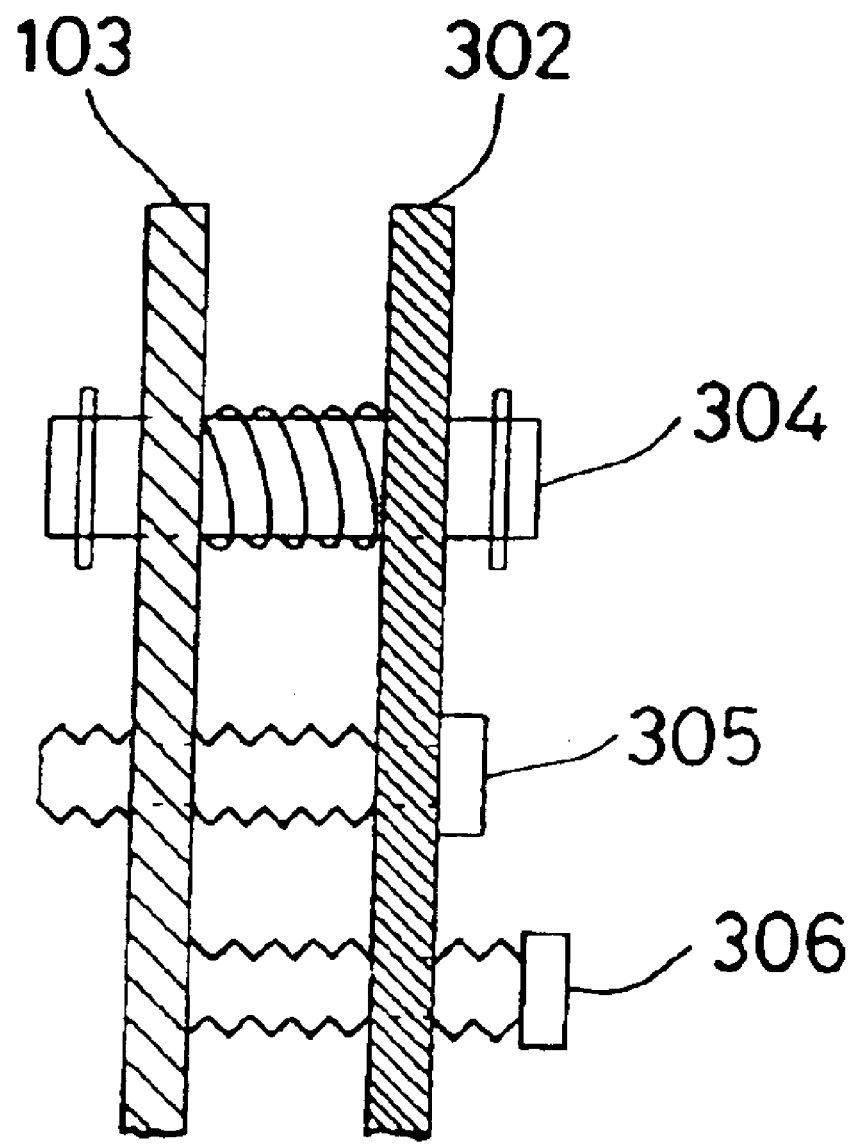
FIG. 12 is a sectional view of a part of a configuration in which an ellipsoidal mirror anchoring plate and a spherical mirror anchoring plate are fixed in the lamp housing according to the second embodiment.

The guides 304 are for controlling the moving direction of the spherical mirror anchoring plate 302 with respect to the ellipsoidal mirror anchoring plate 103. And as shown in FIG. 12, the guides 304 are set so that they penetrate through the ellipsoidal mirror anchoring plate 103 and the spherical mirror anchoring plate 302. By tightening or loosening the space adjusting screws 305, the spherical mirror anchoring plate 302 can be moved in the direction of the optical axis 110 with respect to the ellipsoidal mirror anchoring plate 103.

Furthermore, between the ellipsoidal mirror anchoring plate 103 and the spherical mirror anchoring plate 302, springs 307 are set using the guides 304 as cores to make the delicate adjustment of the spacing between the ellipsoidal mirror anchoring plate 103 and the spherical mirror anchoring plate 302 easy, as well as to maintain the adjusted spacing.

Furthermore, the fixing screws 306 are for fixing the ellipsoidal mirror anchoring plate 103 and the spherical mirror anchoring plate 302 while maintaining the adjusted spacing.

Furthermore, fixing the ellipsoidal mirror anchoring plate 103 and the spherical mirror anchoring plate 302 at four corners using the guides 304, etc. provides the advantage that dislocation in the gate direction is difficult to cause when adjusting the spacing therebetween.

Now, the adjustment of the optical arrangement at the stage of manufacturing the lighting system or the projection display system will be described.

First, the necessity of the optical arrangement is explained. With respect to the ellipsoidal mirror 102 within the lamp housing 313, as in the first embodiment, due to irregularity in the open shape and the mirror surface shape, etc., an error is generated with respect to design value for the distance from the actual open surface of the ellipsoidal mirror to the second focal point where a light spot of minimum diameter is obtained by light from the arc lamp 101 placed at the first focal point.

Furthermore, with respect to the spherical mirror 301 within the lamp housing 313, in the same way as the ellipsoidal mirror 102, because it has irregularity in the open shape and the mirror surface shape, etc., the distance from the open surface of the spherical mirror 301 to the actual center of curvature has an error with respect to design value. The actual center of curvature herein refers to the position where light from the light source placed at the center of curvature of design is condensed into a light spot of minimum diameter.

Thus, as described above, when the lamp housing 313 is exchanged due to exhaustion of the arc lamp 101, etc., or when the lamp housing 313 is newly manufactured, to utilize the light of the arc lamp 101 effectively, it is necessary that the positions of the arc lamp 101, the ellipsoidal mirror 102, and the spherical mirror 301 with respect to an optical member such as a cold mirror 151, etc. other than the lamp housing 313 are adjusted taking the above-mentioned error into account.

Figure 13:
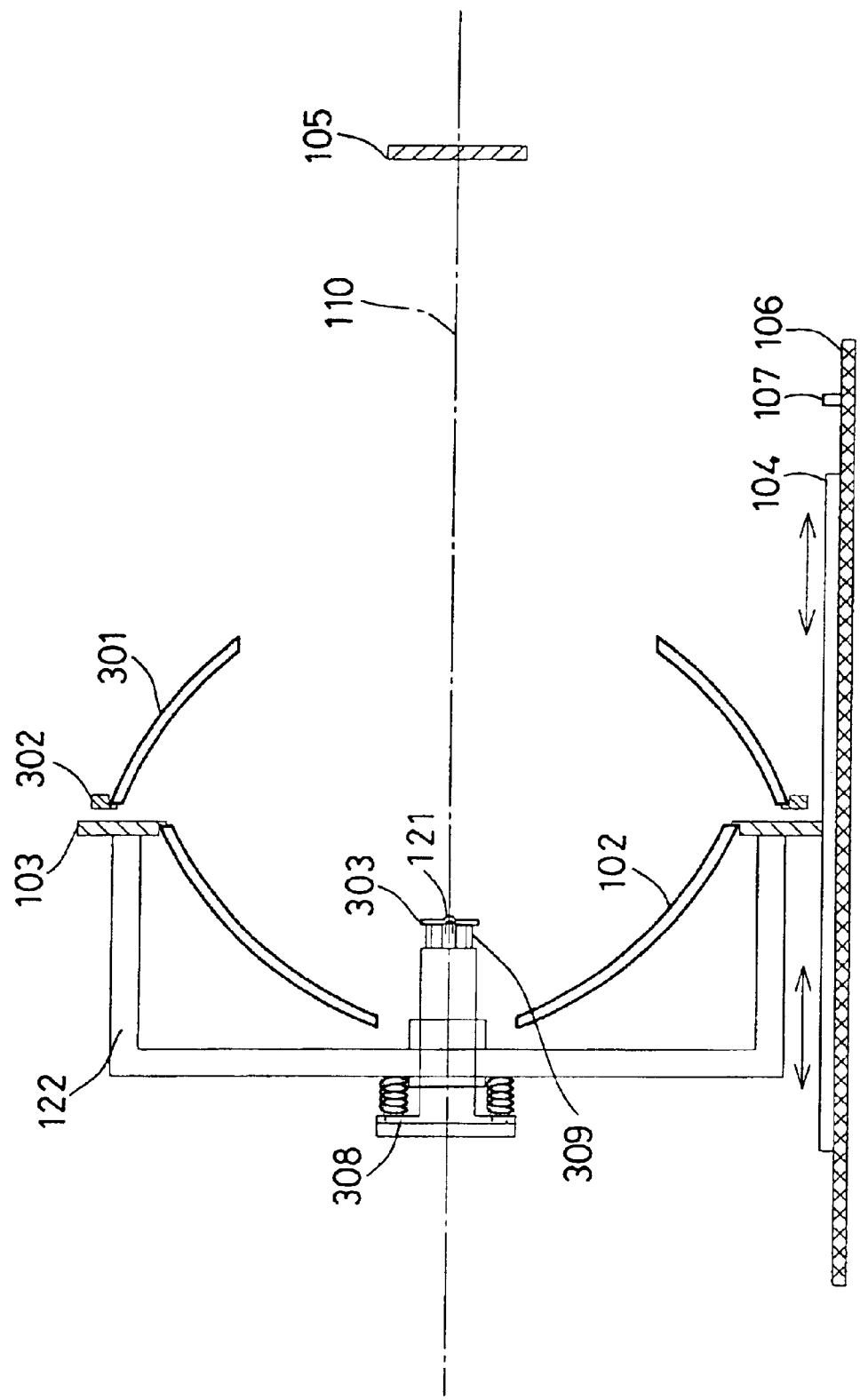
FIG. 13 is a sectional view showing a condition in which an optical arrangement of the lamp housing is adjusted using an adjusting device in the second embodiment.

The adjusting device according to this embodiment can adjust the lamp housing 313 as a single unit before being incorporated in a lighting system or a projection display system. As shown in FIG. 13, the adjusting device includes an ellipsoidal mirror condensed-state confirming surface 105 (first condensed-state confirming means), a tungsten lamp 121 (adjusting light source), a tungsten lamp anchoring plate 122, and a spherical mirror condensed-state confirming surface 303 (second condensed-state confirming means).

In the same way as in the first embodiment, the tungsten lamp 121 and the tungsten lamp anchoring plate 122 are mounted to the ellipsoidal mirror 102 and the ellipsoidal mirror anchoring plate 103 before combining the arc lamp 101. Furthermore, the optical arrangement is adjusted with the adjusting device under the condition in which the side plates and the top plate of the lamp housing 313 are not present.

At this time, an end of the tungsten lamp anchoring plate 122 is attached to the ellipsoidal mirror anchoring plate 103 so that the position of the center of the luminous part of the tungsten lamp 121 coincides with the first focal point of the ellipsoidal mirror 102. Furthermore, the screws 108 for fixing the base substrate 104 to the bottom plate 106 of the lamp housing 313 are loosened so that the base substrate 104 slides in parallel with the optical axis 110 of the ellipsoidal mirror 102.

Thus, the ellipsoidal mirror 102, the ellipsoidal mirror anchoring plate 103, the spherical mirror 301, the spherical mirror anchoring plate 302, the tungsten lamp 121, and the tungsten lamp anchoring plate 122, which are fixed on the base substrate 104, can slide on the bottom plate 106 without changing their relative positions.

Furthermore, the ellipsoidal mirror condensed-state confirming surface 105 is placed on the optical axis 110 perpendicularly to the optical axis 110 and at a predetermined distance with respect to the bottom plate 106 of the lamp housing 313 fixed to the adjusting device. In this embodiment, in the same way as in the first embodiment, a positioning pin 107 is set to the bottom plate 106, and the ellipsoidal mirror condensed-state confirming surface 105 is placed using an appropriate jig (not shown) so that its distance from the positioning pin 107 is a predetermined distance d. For the positioning pin 107, the distance from an end of the bottom plate 106 to the center of the pin is specified accurately. Also, the distance d is determined so that the ellipsoidal mirror condensed-state confirming surface 105 is placed at the position that should be the second focal point of the ellipsoidal mirror 102.

Figure 14:
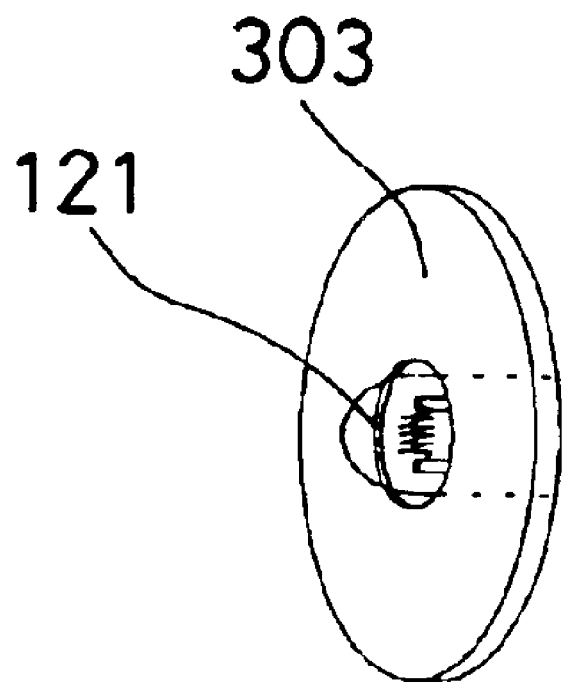
FIG. 14 is a perspective view showing an example of a configuration of a spherical mirror condensed-state confirming surface included in the adjusting device according to the second embodiment.

A spherical mirror condensed-state confirming surface 303 is placed in the same plane as the center of the luminous part of the tungsten lamp 121. As shown in FIG. 14, the spherical mirror condensed-state confirming surface 303 has a little larger hole than the outer diameter of the tungsten lamp 121, using the optical axis 110 as an approximate center. As shown in FIG. 13, the spherical condensed-state confirming surface 303 is fixed to the tungsten lamp anchoring plate 122 with fixing screws 309 so that the spherical mirror condensed-state confirming surface 303 is perpendicular to the optical axis 110.

Figure 15:
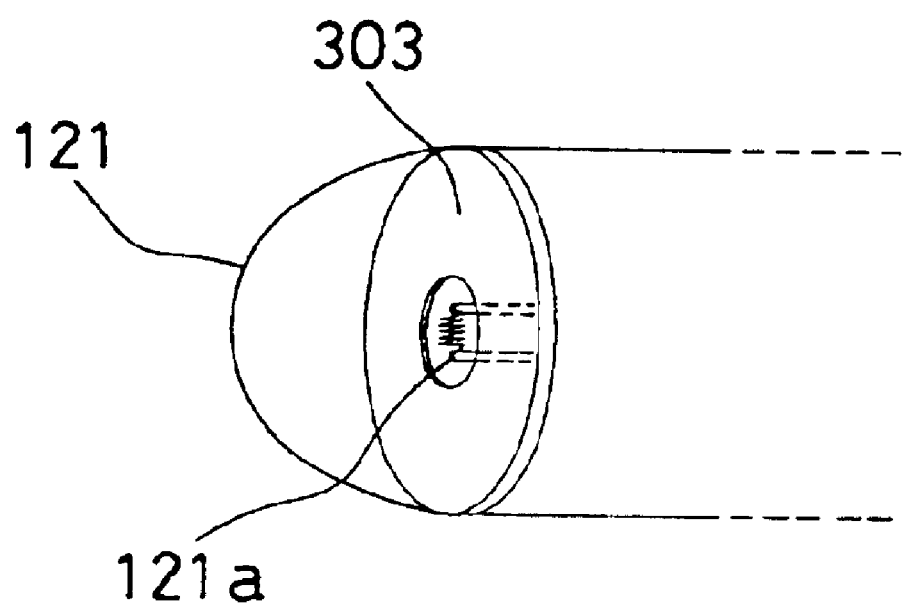
FIG. 15 is a perspective view showing another example of a configuration of a spherical mirror condensed-state confirming surface included in the adjusting device according to the second embodiment.

Furthermore, as shown in FIG. 15, the spherical mirror condensed-state confirming surface 303 may have the configuration in which a ring-shaped circular plate having a little larger hole than the luminous part 121a of the tungsten lamp 121 is placed within the vessel of the tungsten lamp 121. This configuration has the advantage that, because the condensed state of light can be confirmed within the vessel, the condition in which the condensed state of light generated from the tungsten lamp 121 becomes a minimum spot can be detected correctly, and precision of adjustment is improved.

Figure 16:
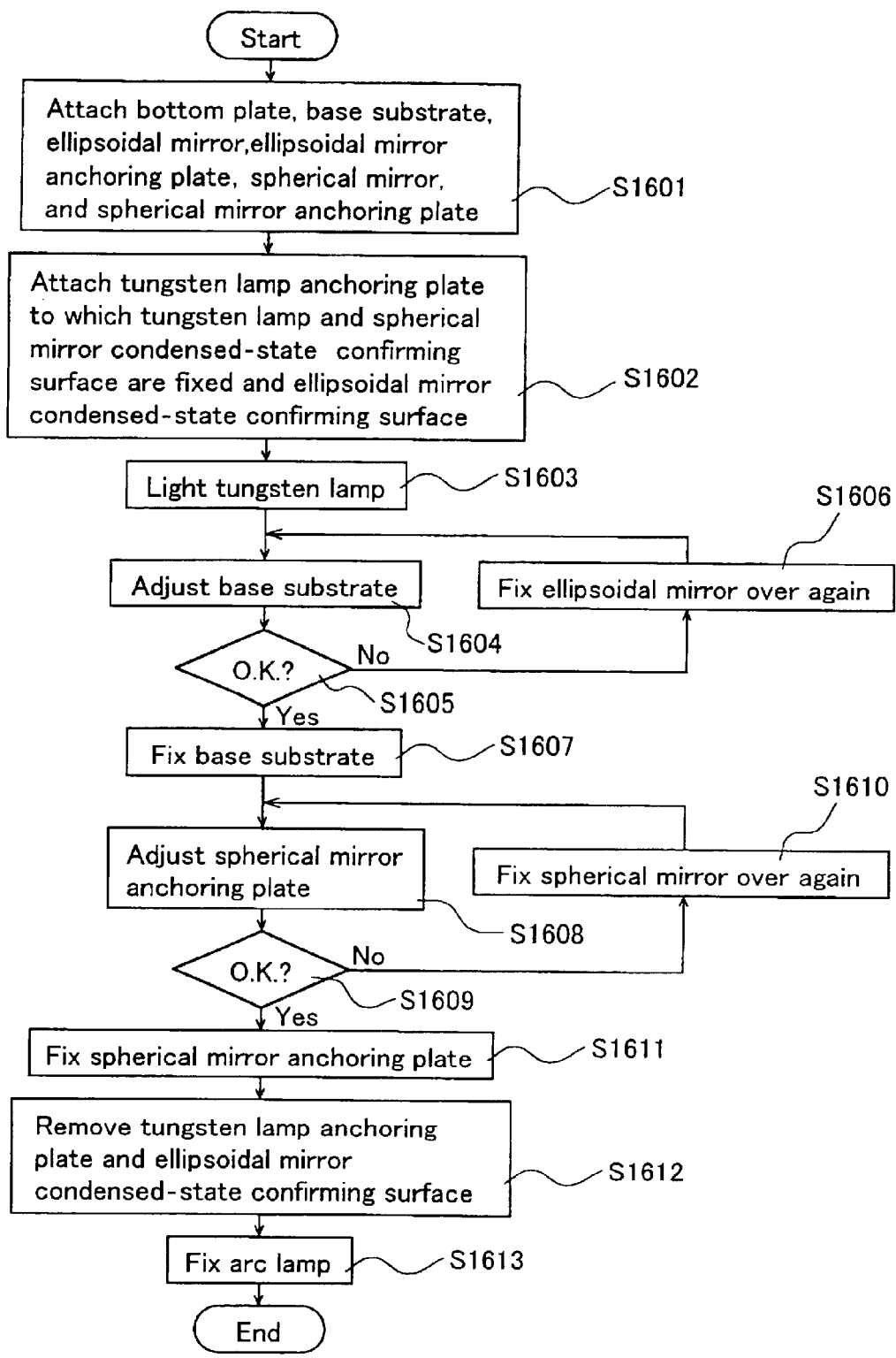
FIG. 16 is a flowchart showing a procedure for adjusting an optical arrangement of the lamp housing in the second embodiment.

In the following, referring to FIG. 16, the procedure for adjusting the optical arrangement using this adjusting device will be described.

First, as described above, the base substrate 104 is attached to the bottom plate 106 of the lamp housing 313. Then, the ellipsoidal mirror anchoring plate 103 to which the ellipsoidal mirror 102 is fixed is attached to the base substrate 104 (S1601).

Then, the tungsten lamp anchoring plate 122 to which the tungsten lamp 121 of the adjusting device is fixed is set to the ellipsoidal mirror anchoring plate 103 before combining the arc lamp 101, and the ellipsoidal mirror condensed-state confirming surface 105 is placed using an appropriate jig at a predetermined distance d from the positioning pin 107 of the bottom plate 106 of the lamp housing 313 (S1602).

Then, the tungsten lamp 121 is lighted (S1603), and adjustment is carried out by moving the base substrate 104 on the bottom plate 106 in parallel with the optical axis 110 so that light from the tungsten lamp 121 is condensed into a light spot of minimum diameter on the ellipsoidal mirror condensed-state confirming surface 105 by the ellipsoidal mirror 102 (S1604). At this time, the spherical mirror anchoring plate 302 is fixed to the ellipsoidal mirror anchoring plate 103 by tightening the fixing screws 306, and the ellipsoidal mirror 102 and the spherical mirror 301 move integrally with the movement of the base substrate 104.

At this time, the position of the second focal point in the plane of the ellipsoidal mirror condensed-state confirming surface 105 also is adjusted (S1605, S1606). That is, a mark is put in advance on the position where the second focal point should be placed (not shown) in the plane of the ellipsoidal mirror condensed-state confirming surface 105. When the center of the light spot is greatly different from the position of the mark, the ellipsoidal mirror 102 is once removed from the ellipsoidal mirror anchoring plate 103, and is fixed again so that the center of the light spot approaches the mark. When the center of the light spot coincides with the mark, the adjustment of S1604 is carried out again.

Then, the base substrate 104 is fixed to the bottom plate 106 by tightening the screws 108 at such a position that light from the tungsten lamp 121 is condensed into a light spot of minimum diameter by the ellipsoidal mirror 102 (S1607). Accordingly, the ellipsoidal mirror 102 is fixed under the condition in which error of the position of the second focal point due to irregularity in the mirror surface shape of the ellipsoidal mirror 102, etc. has been corrected.

Next, the center of the luminous part of the tungsten lamp 121 is placed at the position where the center of curvature of the spherical mirror 301 should be located, while maintaining the condition in which the center of the luminous part of the tungsten lamp 121 and the spherical mirror condensed-state confirming surface 303 are in the same plane. Thus, the tungsten lamp anchoring plate 122 of this embodiment has a mechanism 308 (adjusting light source fixing means) for fixing the tungsten lamp 121 movably in the direction of the optical axis 110. With this mechanism, only the center of the luminous part of the tungsten lamp 121 is moved from the first focal point of the ellipsoidal mirror 102 to the position where the center of curvature of the spherical mirror 301 should be located, without changing the relative positions among the ellipsoidal mirror 102, the ellipsoidal mirror anchoring plate 103, the spherical mirror 301, the spherical mirror anchoring plate 302, the base substrate 104, and the bottom plate 106.

Then, the fixing screws 306 are loosened so that the spherical mirror anchoring plate 302 is movable with respect to the ellipsoidal mirror anchoring plate 103. Under this condition, the position of the spherical mirror 301 is adjusted by adjusting the tightening degree of the space adjusting screws 306 so that the light emitted from the tungsten lamp 121 and reflected by the spherical mirror 301 is condensed into a light spot of minimum diameter on the spherical mirror condensed-state confirming surface 303, thereby changing the relative position of the spherical mirror anchoring plate 302 with respect to the ellipsoidal mirror anchoring plate 103 (S1608).

Then, the spherical mirror anchoring plate 302 is fixed to the ellipsoidal mirror anchoring plate 103 by tightening the fixing screws 306 at such a position that the light emitted from the tungsten lamp 121 and reflected by the spherical mirror 301 is condensed into a light spot of minimum diameter on the spherical mirror condensed-state confirming surface 303, and thereby the relative positions of the ellipsoidal mirror 102 and the spherical mirror 301 are determined under the condition in which an error of the distance from the open surface of the spherical mirror to the position of the condensed light due to irregularity in the open shape and the mirror surface shape of the spherical mirror 301 has been corrected.

At this time, on the spherical mirror condensed-state confirming surface 303, when the center of the light spot is greatly different from the position of the center of the central hole provided in the spherical mirror condensed-state confirming surface 303, the fixed position of the spherical mirror 301 is adjusted (S1609, S1610). In this case, the fixed portion of the spherical mirror 301 is released from the spherical mirror anchoring plate 302, and it is fixed again so that the center of the light spot approaches the center of the central hole. Then, when the center of the light spot coincides with the center of the central hole provided in the spherical mirror condensed-state confirming surface 303, the adjustment of S1608 is carried out again.

In S1610, as the configuration for making the fixed position of the spherical mirror 301 adjustable with respect to the spherical mirror anchoring plate 302, the same configuration as that illustrated in FIG. 7 in the first embodiment for fixing the ellipsoidal mirror 102 to the ellipsoidal mirror anchoring plate 103 can be used.

When the adjustment of S1608 to S1610 is completed, the spherical mirror anchoring plate 302 is fixed to the ellipsoidal mirror anchoring plate 103 by tightening the fixing screws 306 (S1611).

Figure 17:
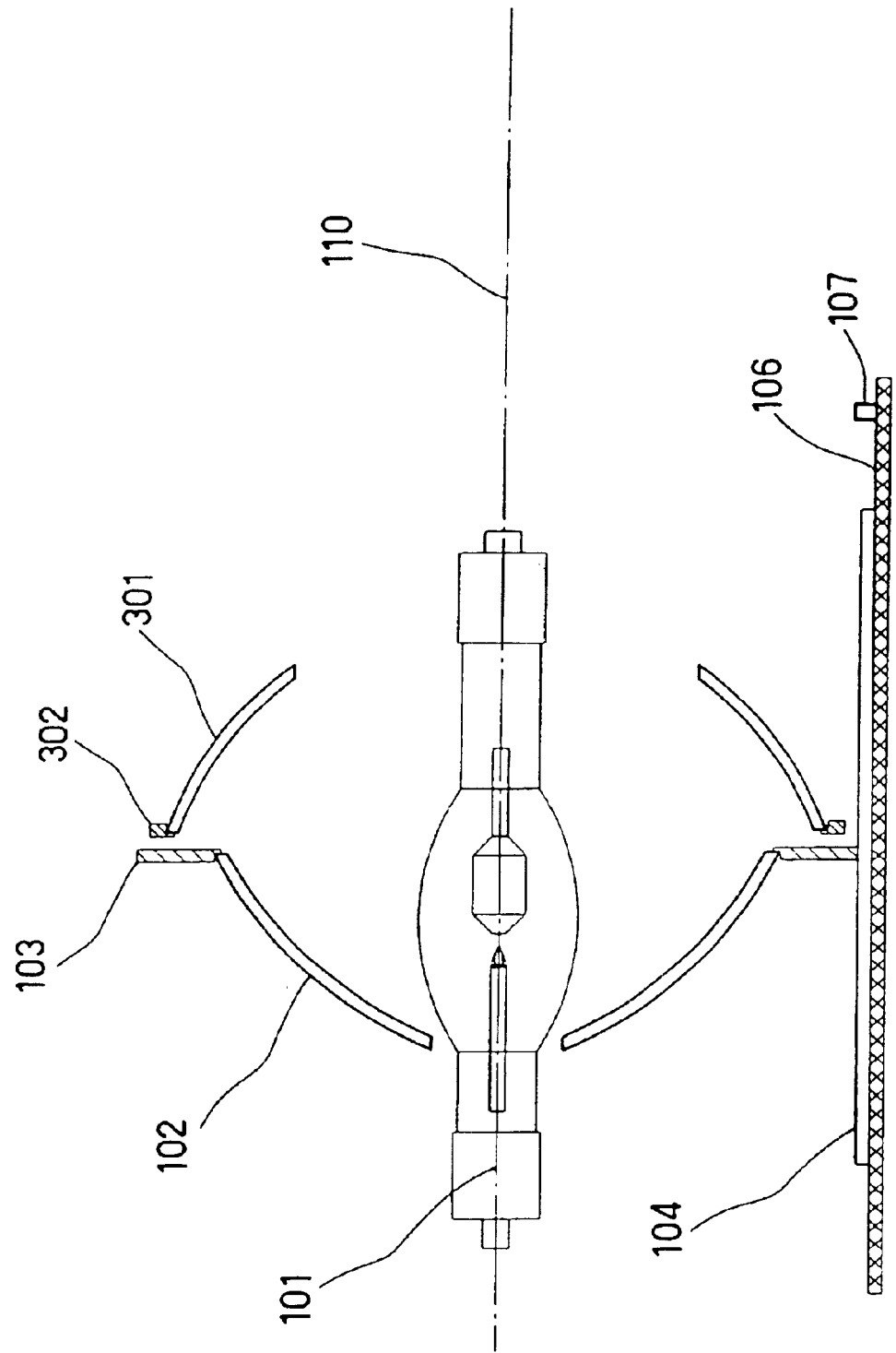
FIG. 17 is a sectional view showing a condition in which the adjusting device is removed from the lamp housing in which the optical arrangement has been adjusted using the adjusting device, and an arc lamp is mounted, in the second embodiment.
Figure 18:
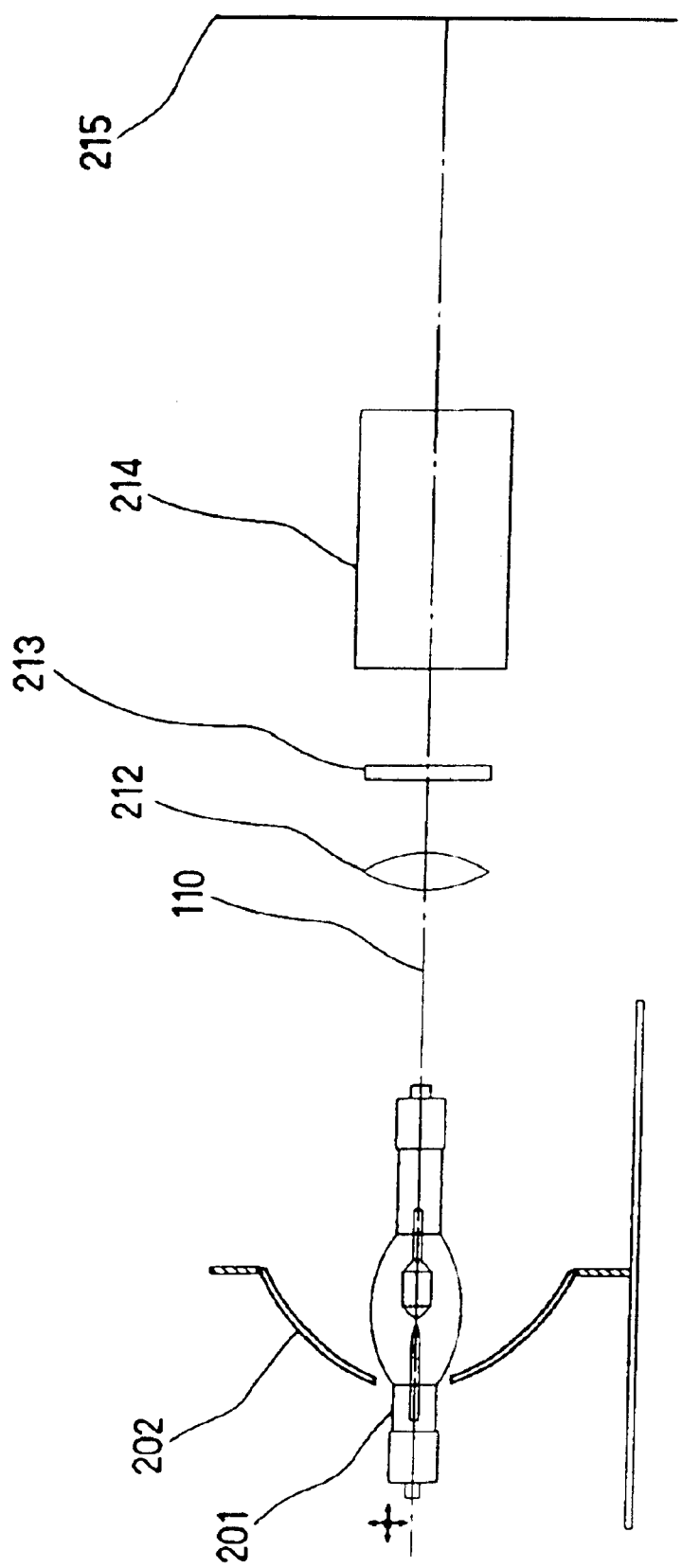
FIG. 18 is a sectional view showing a first prior art example of a configuration in which an optical arrangement of a lamp and a reflector is adjusted.
Figure 19:
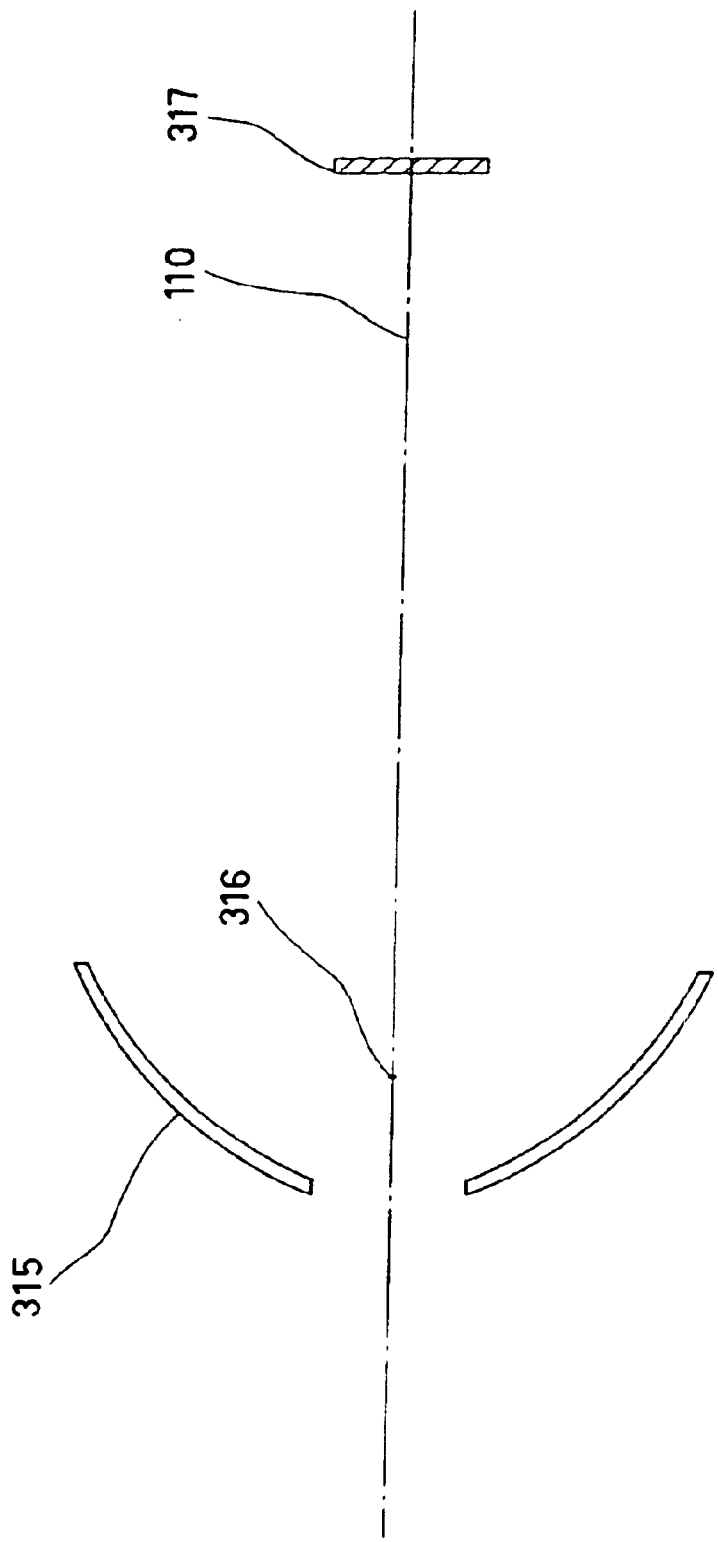
FIG. 19 is a sectional view showing a second prior art example of a configuration in which an optical arrangement of a lamp and a reflector is adjusted.
Figure 20:
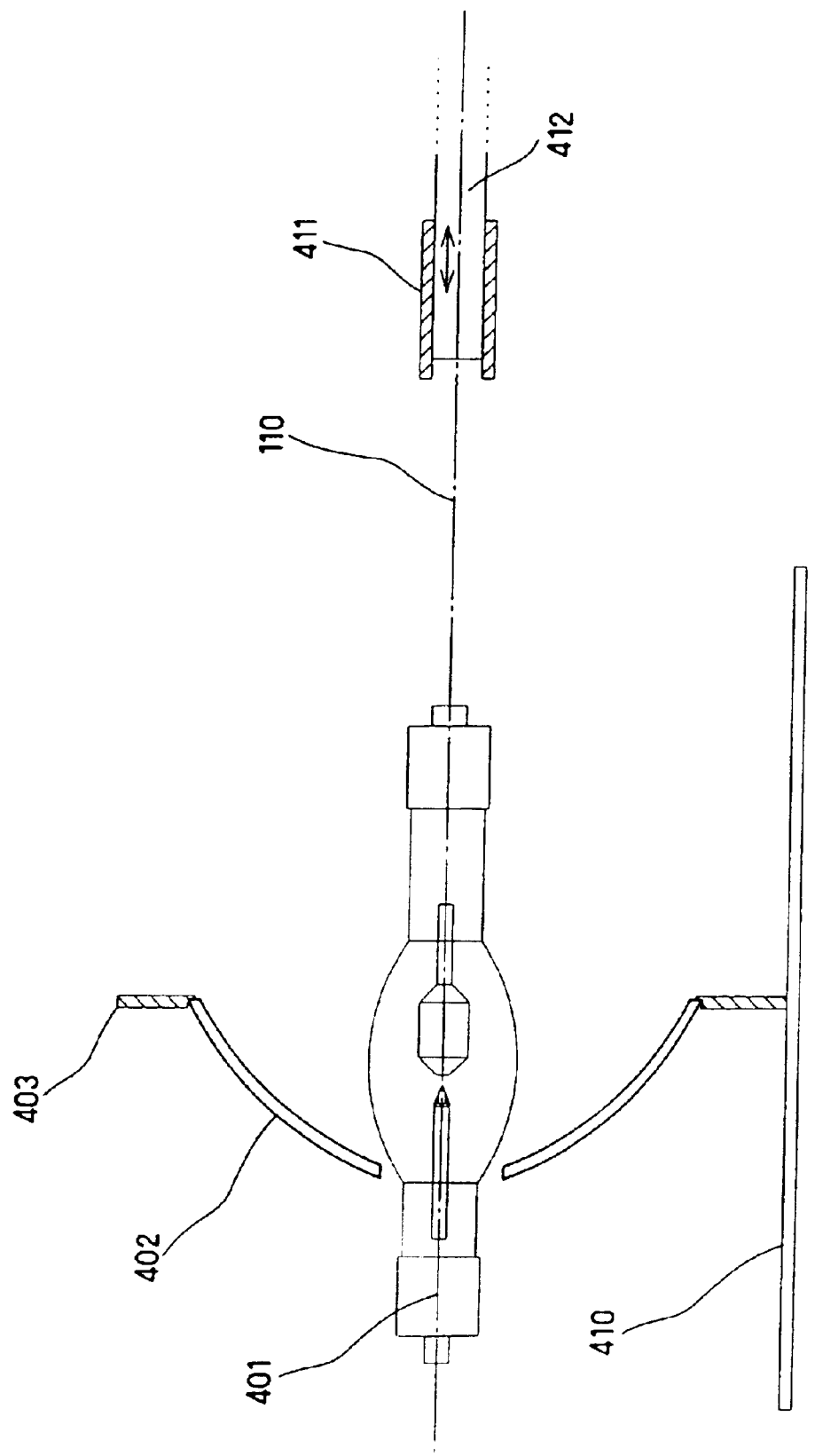
FIG. 20 is a sectional view showing a third prior art example of a configuration in which an optical arrangement of a lamp and a reflector is adjusted.

Thereafter, the tungsten lamp 121 and the tungsten lamp anchoring plate 122 are removed (S1612), and as shown in FIG. 17, the arc lamp 101 is assembled with the ellipsoidal mirror anchoring plate 103 using an arc lamp anchoring plate (not shown) so that the arc center of the arc lamp 101 coincides with the position where the center of the luminous part of the tungsten lamp 121 has been located, namely, the first focal point of the ellipsoidal mirror 102 (S1613). Thus, by making the arc center of the arc lamp 101 coincide with the first focal point of the ellipsoidal mirror 102, light emitted from the arc lamp 101 can be condensed on the second focal point of the ellipsoidal mirror 102 most effectively.

Then, as shown in FIG. 9, a lighting system is completed by assembling the lamp housing 313 by attaching side plates and a top plate to the bottom plate 106, and placing a cold mirror 151 and a lens 152 at predetermined positions. Because FIG. 9 represents a cross section of the lamp housing 313, etc. cut in a plane containing the optical axis 110 of the ellipsoidal mirror 102 and parallel to the base substrate 104, the top plate of the lamp housing 313 does not appear in this drawing.

Furthermore, as shown in FIG. 10, a projection display system can be obtained by additionally providing a beam splitter 154, an optical modulator 155 and a projection lens 156 to the lighting system in the traveling direction of the light emitted from the arc lamp 101, reflected by the cold mirror 151 and passed through the lens 152. In the same way as FIG. 9, because FIG. 10 also represents a cross section of the lamp housing 313, etc. cut in a plane containing the optical axis 110 of the ellipsoidal mirror 102 and parallel to the base substrate 104, the top plate of the lamp housing 313 does not appear in this drawing.

As the optical modulator 155 included in the lighting system, a reflection type light valve, a transmission type light valve, or an optical modulator of optical writing system, etc. may be used.

As mentioned above, according to this embodiment, the optical arrangement of the ellipsoidal mirror 102 and the arc lamp 101 within the lamp housing 313 can be adjusted properly by adjusting the position of the base substrate 104 on the bottom plate 106 of the lamp housing 313 using the tungsten lamp 121 and the ellipsoidal mirror condensed-state confirming surface 105 before combining the arc lamp 101. Furthermore, by using the spherical mirror condensed-state confirming surface 303, the position of the spherical mirror 301 can be adjusted properly. Accordingly, the lamp housing 313 as a single unit can be adjusted by a simple procedure without requiring a large-scale adjusting device so that light from the arc lamp 101 is utilized with highest efficiency.

Furthermore, in this way, by having the lamp housing 313 adjusted so that light is utilized with highest efficiency, bright lighting system and projection display system can be provided.

Although the configuration in which the tungsten lamp 121 is used as a light source of the adjusting device is exemplified in the above description, a halogen lamp, a semiconductor laser light source, or an outgoing end of light-transmitting optical fiber other than a tungsten lamp also may be used.

Furthermore, when higher precision of adjustment is required, an optical sensor such as a CCD camera or a photodiode may be used as the ellipsoidal mirror condensed-state confirming surface 105.

Furthermore, although the lens 152 as a single lens is illustrated in FIGS. 9 and 10, combined optical members such as a plurality of lenses, etc. also may be employed.

Furthermore, although a configuration including only one optical modulator 155 is illustrated in FIG. 10, a configuration including a plurality of optical modulators also may be employed.

INDUSTRIAL APPLICABILITY

As mentioned above, according to the present invention, a light source apparatus having a properly adjusted optical arrangement can be provided by a simple procedure without requiring a large-scale adjusting device. Also, using this light source apparatus, bright lighting system and projection display system with high efficiency of utilizing light can be provided.

What is claimed is:

1. A light source apparatus comprising a light source and a concave mirror for condensing light emitted from the light source, the light source apparatus comprising:

a movable substrate that is set on a bottom plate of the light source apparatus and is movable in a traveling direction of light condensed by the concave mirror;

a concave mirror anchoring plate for anchoring the concave mirror to the movable substrate; and a positioning member that is provided on the bottom plate for indicating a reference position for setting a condensed-state confirming means at a predetermined position;

wherein the condensed-state confirming means is used when adjusting a position of the concave mirror with respect to the bottom plate.

2. The light source apparatus according to claim 1, further comprising a concave mirror fixing member for fixing the concave mirror to the concave mirror anchoring plate, wherein the concave mirror fixing member is a plate spring made of stainless steel.

3. The light source apparatus according to claim 2, wherein a thickness of the plate spring is greater than 0.2 mm, but is smaller than 0.5 mm.

4. The light source apparatus according to claim 1, further comprising a movable substrate fixing member for fixing the movable substrate to the bottom plate.

5. The light source apparatus according to claim 1, wherein an arc lamp is used as the light source, and a center of a luminous part of the arc lamp coincides with a first focal point of the concave mirror.

6. The light source apparatus according to claim 1, wherein the concave mirror is an ellipsoidal mirror.

7. A lighting system comprising a light source apparatus according to claim 1, and an optical means for converting light condensed by the concave mirror of the light source apparatus into approximately parallel light.

8. A projection display system comprising a light source apparatus according to claim 1, an optical means for converting light condensed by the concave mirror of the light source apparatus into approximately parallel light, an optical modulator for forming an optical image by modulating light emitted from the optical means, and a projection lens for projecting the optical image.

9. A light source apparatus comprising a light source, a first concave mirror for condensing light emitted from the light source, and a second concave mirror having a reflection surface opposing a reflection surface of the first concave mirror, the light source apparatus comprising:

a movable substrate that is set on a bottom plate of the light source apparatus and is movable in a traveling direction of light condensed by the first concave mirror;

a first concave mirror anchoring plate for anchoring the first concave mirror to the movable substrate; and a second concave mirror anchoring plate that is attached to the first concave mirror anchoring plate and anchors the second concave mirror.

10. The light source apparatus according to claim 9, further comprising a first concave mirror fixing member and a second concave mirror fixing member for fixing the first and second concave mirrors to the first and second concave mirror anchoring plates, respectively, wherein the first and second concave mirror fixing members are plate springs made of stainless steel.

11. The light source apparatus according to claim 10, wherein a thickness of the plate springs is greater than 0.2 mm, but is smaller than 0.5 mm.

12. The light source apparatus according to claim 9, further comprising on the bottom plate, a positioning member for fixing a condensed-state confirming means used when adjusting a position of the first concave mirror with respect to the bottom plate.

13. The light source apparatus according to claim 9, further comprising a movable substrate fixing member for fixing the movable substrate to the bottom plate.

14. The light source apparatus according to claim 9, further comprising an anchoring plate position adjusting means that adjusts relative positions of the first and second concave mirror anchoring plates.

15. The light source apparatus according to claim 14, wherein the anchoring plate position adjusting means is placed at four corners of the first and second concave mirror anchoring plates.

16. The light source apparatus according to claim 9, further comprising an anchoring plate fixing means for fixing relative positions of the first and second concave mirror anchoring plates.

17. The light source apparatus according to claim 16, wherein the anchoring plate fixing means is placed at four corners of the first and second concave mirror anchoring plates.

18. The light source apparatus according to claim 9, wherein an arc lamp is used as the light source, and a center of a luminous part of the arc lamp coincides with a first focal point of the first concave mirror.

19. The light source apparatus according to claim 9, wherein the first concave mirror is an ellipsoidal mirror.

20. The light source apparatus according to claim 9, wherein the second concave mirror is a spherical mirror.

21. A lighting system comprising a light source apparatus according to claim 9, and an optical means for converting light condensed by the first concave mirror of the light source apparatus into approximately parallel light.

22. A projection display system comprising a light source apparatus according to claim 9, an optical means for converting light condensed by the first concave mirror of the light source apparatus into approximately parallel light, an optical modulator for forming an optical image by modulating light emitted from the optical means, and a projection lens for projecting the optical image.

23. An adjusting device for adjusting an optical arrangement, for a light source apparatus comprising a light source, a concave mirror for condensing light emitted from the light source, a movable substrate that is set on a bottom plate of the light source apparatus and is movable in a traveling direction of light condensed by the concave mirror, and a concave mirror anchoring plate for anchoring the concave mirror to the movable substrate, using an adjusting light source before mounting the light source, the adjusting device comprising:

an adjusting light source fixing means that is attached to the concave mirror anchoring plate and fixes a center of a luminous part of the adjusting light source at a predetermined optical position with respect to the concave mirror.

24. The adjusting device according to claim 23, wherein the predetermined optical position is a first focal point of the concave mirror.

25. The adjusting device according to claim 23, further comprising a condensed-state confirming means for observing a state of light emitted from the adjusting light source condensed by the concave mirror.

26. The adjusting device according to claim 25, wherein the condensed-state confirming means has a surface on which light is condensed, which is set perpendicularly to an optical axis of light emitted from the adjusting light source and reflected by the concave mirror.

27. The adjusting device according to claim 26, wherein the surface is positioned and fixed on the bottom plate of the light source apparatus so that the surface is located at a position where a second focal point of the concave mirror should be placed.

28. The adjusting device according to claim 25, wherein the condensed-state confirming means is an optical sensor.

29. The adjusting device according to claim 23, wherein any of a tungsten lamp, a halogen lamp, a semiconductor laser light source, and an outgoing end of light-transmitting optical fiber is used as the adjusting light source.

30. The adjusting device according to claim 23, further comprising, on a bottom plate, a positioning member indicating a reference position for setting at a predetermined position a condensed-state confirming means used when adjusting a position of the concave mirror.

31. An adjusting device for adjusting an optical arrangement, for a light source apparatus comprising a light source, a first concave mirror for condensing light emitted from the light source, a second concave mirror having a reflection surface opposing to a reflection surface of the first concave mirror, a movable substrate that is set on a bottom plate of the light source apparatus and is movable in a traveling direction of light condensed by the first concave mirror, a first concave mirror anchoring plate for anchoring the first concave mirror to the movable substrate, and a second concave mirror anchoring plate that is attached to the first concave mirror anchoring plate and anchors the second concave mirror, using an adjusting light source before mounting the light source, the adjusting device comprising:

an adjusting light source fixing means that is attached to the first concave mirror anchoring plate and fixes the adjusting light source movably so that a center of a luminous part of the adjusting light source is located at a predetermined optical position.

32. The adjusting device according to claim 31, wherein the predetermined optical position includes a first focal point of the first concave mirror and a position where a center of curvature of the second concave mirror should be placed.

33. The adjusting device according to claim 31, further comprising a first condensed-state confirming means for observing a state of light emitted from the adjusting light source condensed by the first concave mirror.

34. The adjusting device according to claim 33, wherein the first condensed-state confirming means has a surface on which light is condensed, which is set perpendicularly to an optical axis of light emitted from the adjusting light source and reflected by the first concave mirror.

35. The adjusting device according to claim 34, wherein the surface of the first condensed-state confirming means is positioned and fixed on the bottom plate of the light source apparatus so that the surface is located at a position where a second focal point of the first concave mirror should be placed.

36. The adjusting device according to claim 33, wherein the first condensed-state confirming means is an optical sensor.

37. The adjusting device according to claim 31, further comprising a second condensed-state confirming means for observing a state of light emitted from the adjusting light source condensed by the second concave mirror.

38. The adjusting device according to claim 37, wherein the second condensed-state confirming means has a surface on which light is condensed, which is set perpendicularly to an optical axis of light reflected by the first concave mirror.

39. The adjusting device according to claim 38, wherein the surface of the second condensed-state confirming means is attached to the adjusting light source fixing means so that the surface is located at a position where a center of curvature of the second concave mirror should be placed.

40. The adjusting device according to claim 38, wherein the surface of the second condensed-state confirming means is placed within a vessel of the adjusting light source.

41. The adjusting device according to claim 31, wherein any of a tungsten lamp, a halogen lamp, a semiconductor laser light source, and an outgoing end of light-transmitting optical fiber is used as the adjusting light source.

42. A method for manufacturing a light source apparatus comprising a light source, a concave mirror for condensing light emitted from the light source, a movable substrate that is set on a bottom plate of the light source apparatus and is movable in a traveling direction of light condensed by the concave mirror, and a concave mirror anchoring plate for anchoring the concave mirror to the movable substrate, the method comprising:

mounting the movable substrate on the bottom plate;
attaching the concave mirror anchoring plate to the movable substrate;

mounting an adjusting light source so that a center of a luminous part of the adjusting light source is located at a first optical basis position with respect to the concave mirror attached to the concave mirror anchoring plate;

placing a condensed-state confirming means for observing a state of light condensed by the concave mirror at a second optical basis position;

adjusting a position of the movable substrate on the bottom plate so that a condensed state of light observed by the condensed-state confirming means is optimum; and removing the adjusting light source and mounting the light source so that a center of a luminous part of the light source coincides with the position where the center of the luminous part of the adjusting light source has been located.

43. The method for manufacturing a light source apparatus according to claim 42, wherein the first optical basis position is a first focal point of the concave mirror.

44. The method for manufacturing a light source apparatus according to claim 42, wherein the second optical basis position is a position where a second focal point of the concave mirror should be placed.

45. The method for manufacturing a light source apparatus according to claim 42, wherein the position of the movable substrate is adjusted by a process comprising:

moving the movable substrate to such a position that a diameter of a light spot observed by the condensed-state confirming means at a minimum and fixing the movable substrate at the position;

adjusting a fixed position of the concave mirror with respect to the concave mirror anchoring plate so that the position of the light spot approaches the second optical basis position; and again, moving the movable substrate to such a position that the diameter of the light spot observed by the condensed-state confirming means at a minimum and fixing the movable substrate at the position.

46. A method for manufacturing a light source apparatus comprising a light source, a first concave mirror for condensing light emitted from the light source, a second concave mirror having a reflection surface opposing to a reflection surface of the first concave mirror, a movable substrate that is set on a bottom plate of the light source apparatus and is movable in a traveling direction of light condensed by the first concave mirror, a first concave mirror anchoring plate for anchoring the first concave mirror to the movable substrate, and a second concave mirror anchoring plate that is attached to the first concave mirror anchoring plate and anchors the second concave mirror, the method comprising:

mounting the movable substrate on the bottom plate;
attaching the first concave mirror anchoring plate to the movable substrate;
attaching the second concave mirror anchoring plate to the first concave mirror anchoring plate;
mounting an adjusting light source so that a center of a luminous part of the adjusting light source is located at a first optical basis position with respect to the first concave mirror attached to the first concave mirror anchoring plate;
placing a first condensed-state confirming means for observing a state of light from the adjusting light source condensed by the first concave mirror at a second optical basis position;
adjusting a position of the movable substrate on the bottom plate so that the condensed state of light observed by the first condensed-state confirming means is optimum;

moving the adjusting light source so that a center of a luminous part of the adjusting light source is located at a third optical basis position with respect to the second concave mirror;

placing a second condensed-state confirming means for observing a state of light condensed by the second concave mirror at a fourth optical basis position;

adjusting a position of the second concave mirror anchoring plate with respect to the first concave mirror anchoring plate so that the condensed state of light observed by the second condensed-state confirming means is optimum; and removing the adjusting light source and mounting the light source so that a center of a luminous part of the light source coincides with the first optical basis position.

47. The method for manufacturing a light source apparatus according to claim 46, wherein the first optical basis position is a first focal point of the first concave mirror.

48. The method for manufacturing a light source apparatus according to claim 46, wherein the second optical basis position is a position where a second focal point of the first concave mirror should be placed.

49. The method for manufacturing a light source apparatus according to claim 46, wherein the third optical basis position is a position where a center of curvature of the second concave mirror should be placed.

50. The method for manufacturing a light source apparatus according to claim 46, wherein the fourth optical basis position is a first focal point of the first concave mirror.

51. The method for manufacturing a light source apparatus according to claim 46, wherein the position of the movable substrate is adjusted by a process comprising:

moving the movable substrate to such a position that a diameter of a light spot observed by the first condensed-state confirming means at a minimum and fixing the movable substrate at the position;

adjusting a fixed position of the first concave mirror with respect to the first concave mirror anchoring plate so that a position of the light spot approaches a position where a second focal point of the first concave mirror should be placed; and again, moving the movable substrate to such a position that the diameter of the light spot observed by the first condensed-state confirming means at a minimum and fixing the movable substrate at the position.

52. The method for manufacturing a light source apparatus according to claim 46, wherein the position of the second concave mirror anchoring plate with respect to the first concave mirror anchoring plate is adjusted by a process comprising:

moving the second concave mirror anchoring plate in parallel with an optical axis of light reflected by the first concave mirror and fixing the second concave mirror anchoring plate so that a diameter of a light spot observed by the second condensed-state confirming means at a minimum;

adjusting a fixed position of the second concave mirror with respect to the second concave mirror anchoring plate so that a position of the light spot approaches the fourth optical basis position; and again, moving the second concave mirror anchoring plate in parallel with the optical axis of light reflected by the first concave mirror and fixing the second concave mirror anchoring plate so that the diameter of the light spot observed by the second condensed-state confirming means at a minimum.

* * * * *